US006529652B1

United States Patent
Brener

(10) Patent No.: US 6,529,652 B1
(45) Date of Patent: Mar. 4, 2003

(54) OPTICAL SWITCH AND METHOD FOR ALIGNING OPTICAL SWITCH COMPONENTS

(75) Inventor: Igal Brener, Westfield, NJ (US)

(73) Assignee: Tellium, Inc., Oceanport, NJ (US)

(*) Notice: Subject to any disclaimer, the term of this patent is extended or adjusted under 35 U.S.C. 154(b) by 0 days.

(21) Appl. No.: 09/754,254

(22) Filed: Mar. 15, 2001

(51) Int. Cl.[7] .................................................. G02B 6/26

(52) U.S. Cl. ........................ 385/16; 385/17; 385/18; 385/19

(58) Field of Search ................... 385/16–24, 25, 385/31; 359/291, 224, 223, 292

(56) References Cited

U.S. PATENT DOCUMENTS 6,243,001 B1 * 6/2001 Hoen ........................... 385/17

* cited by examiner

Primary Examiner—Phan T. H. Palmer
(74) Attorney, Agent, or Firm—Jeffery J. Brosemer; Michaelson & Wallace

(57) ABSTRACT

An optical switch having a fiber/lens array and a switching substrate may be properly aligned using one or more static mirrors or photodetectors provided on the switching substrate. The static mirrors may be designed to reflect incident light back into an input fiber, where the back reflected light may be detected, or to a detector provided at a predetermined position. Accordingly, the position of the switching substrate and/or fiber/lens array may be adjusted until reflected light having predetermined power is detected. In another embodiment, the position of the switching substrate and/or fiber/lens array may be adjusted until predetermined power is detected by the photodetectors provided on the switching substrate.

33 Claims, 18 Drawing Sheets

OPTICAL SWITCH AND METHOD FOR ALIGNING OPTICAL SWITCH COMPONENTS

RELATED APPLICATIONS

This application is related in subject matter to U.S. application Ser. No. 09/754,395, filed concurrently herewith and expressly incorporated by reference herein.

BACKGROUND OF THE INVENTION

The present invention relates to an optical switch and a method for aligning components of an optical switch.

Increasing demands for high-speed Internet service and wireless communications are soon expected to outstrip current telecommunications capacity. Because optical fiber networks are capable of transmitting huge volumes of data at blinding speeds, telecommunications carriers are turning to optical fiber networks in an effort to meet future needs.

In order to implement the optical fiber networks of the future, the telecommunications industry needs new optical devices that are inexpensive, efficient, and scalable to accommodate future optical telecommunications network expansion. Telecommunications providers prefer optical fiber networks that can be reconfigured quickly and efficiently. This gives the optical network the flexibility to accommodate growth and changes in future communications patterns. The ability to reconfigure quickly and efficiently also enables the network to restore failed communications by rerouting the communications to bypass the failure.

Optical fiber networks can be reconfigured at network nodes using optical switches to change the coupling between incoming optical fibers and outgoing optical fibers. Currently under development are optical switches that use movable micro-mirrors. These optical switches couple the optical signals between input and output fibers entirely in optical form, instead of converting the optical signals to electrical signals, switching the electrical signals, and converting the switched electrical signals back to optical signals.

To successfully operate such switches, the switch components—including fibers, lenses, and the micro-mirrors—must be properly aligned and the angular position of the movable micro-mirrors must be precisely controlled. If the components are not properly aligned, some or all of the light from the input fibers will not reach the selected output fiber. There remains a need in the art for an optical switch having components that may be easily and accurately aligned and a method for aligning the switch components.

SUMMARY OF THE INVENTION

The present invention has been made in view of the above circumstances and has as an object to provide an economical optical switch having components that may be easily aligned.

A further object of the invention is to provide a method for aligning components of an optical switch.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

DESCRIPTION OF THE PREFERRED EMBODIMENT

Reference will now be made in detail to the present exemplary embodiment(s) of the invention illustrated in the accompanying drawings. Wherever possible, the same reference numbers will be used throughout the drawings to refer to the same or like parts.

Figure 1:
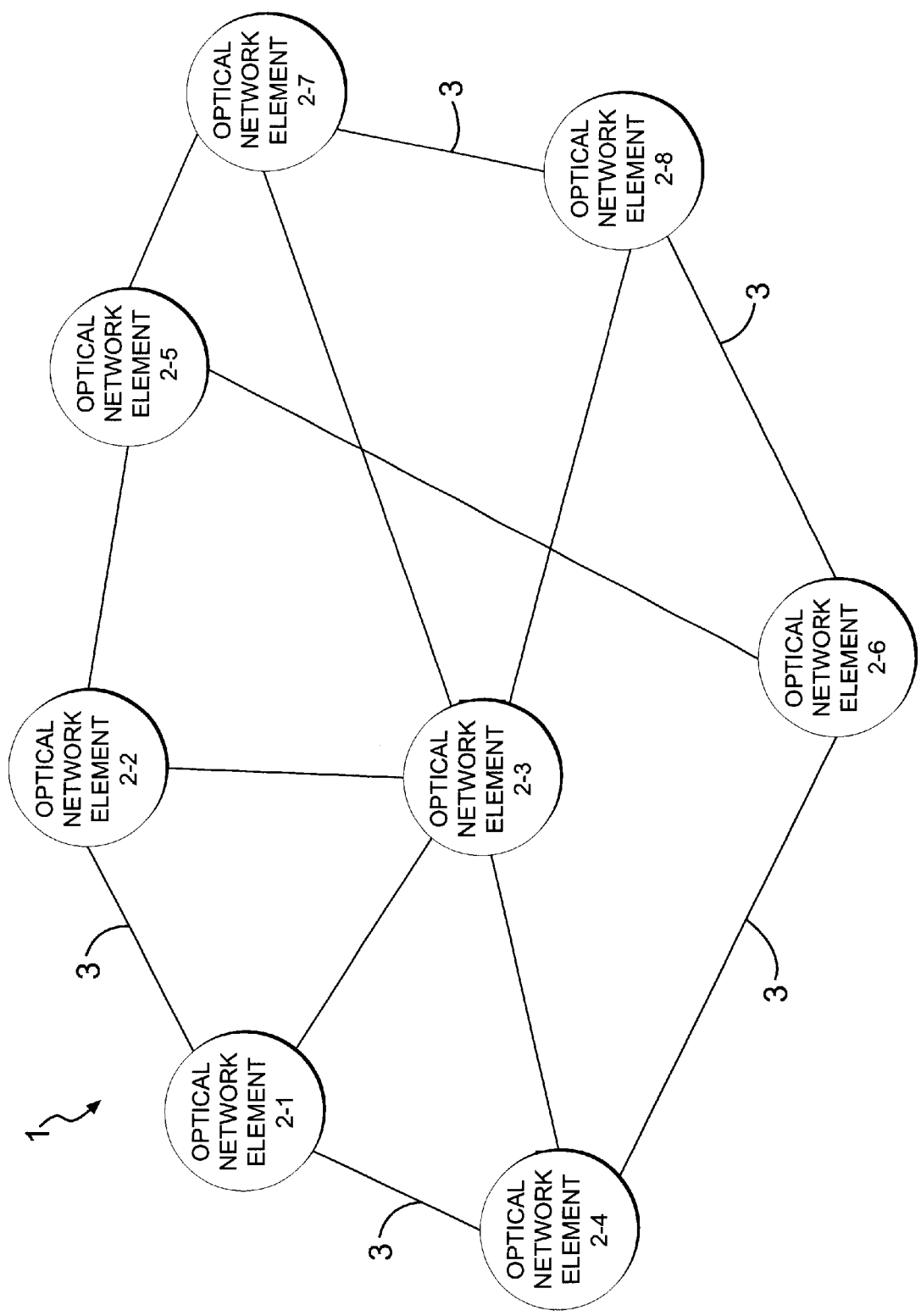
FIG. 1 provides a schematic of an illustrative optical network in accordance with the present invention.

The present invention is useful in optical switches for optical telecommunications network systems that carry optical communications signals, such as wavelength division multiplexed (WDM) signals, over optical fibers. FIG. 1 illustrates an exemplary embodiment of an optical mesh communications network 1. While FIG. 1 illustrates an optical mesh network, the present invention may be used in connection with other optical network architectures, such as ring, chains, and stars, among others, as well as other optical applications. As shown, the network 1 includes optical network elements 2-1 to 2-8 interconnected through optical links 3 in a mesh pattern. Of course, the number of optical network elements 2 and interconnections shown in FIG. 1 is intended as an example only. It should be clear that the present invention is applicable with different numbers and/or interconnections of network elements 2. The optical links 3 are shown generally and may encompass different numbers of optical paths and different physical paths between the network elements 2. The optical links 3 may include, for example, optical fiber.

In general, the optical network elements 2 communicate information signals to other optical network elements through the optical links 3. The optical network elements 2 may include optical cross-connects, add-drop multiplexers, or other switching equipment to allow the signals carried on the optical links 3 to be transmitted through the network elements 2, as necessary, from source to destination. In addition, and not shown in FIG. 1, the optical network elements 2 may be connected to information sources (ingresses) and destinations (egresses) in the locality of that optical network element 2. Thus, for example, information signals may enter the optical mesh network 1 at a local connection to network element 2-1. The information signals may be converted to optical signals, if they are not already, and then travel in the optical network 1 from network element 2-1, through network elements 2-4 and 2-6, and to network element 2-8, where it is passed to a destination in the locality of network element 2-8.

Figure 2:
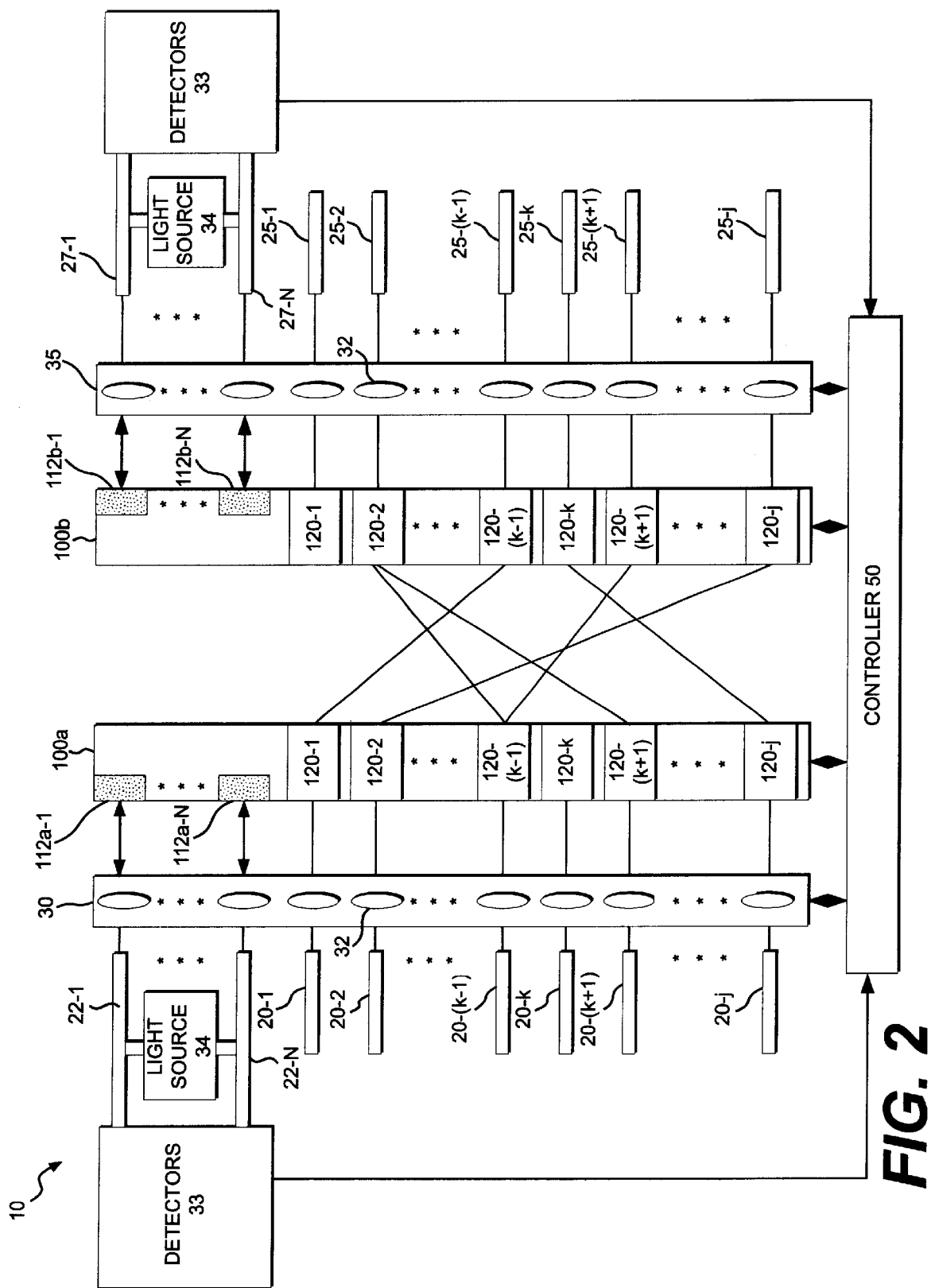
FIG. 2 provides a schematic of an exemplary optical switch in accordance with the present invention.

FIG. 2 illustrates a schematic of such an exemplary optical switch 10 in accordance with the present invention. Optical switch 10 may be located in an optical network element 2, such as shown in FIG. 1. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The optical signals may be provided, for example, from a local ingress or from another node 2 and may be selectively provided to a selected node 2 or local egress. The present invention is not limited by the types of the optical signals carried by the input optical fibers 20 and output optical fibers 25. Each optical input fiber 20 may carry WDM signals, a single wavelength optical signal that was demultiplexed from a WDM signal by a wavelength division demultiplexer, or other types of optical signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 2 shows a schematic of an embodiment with j input optical fibers 20 and j output optical fibers 25, the number of input optical fibers 20 may differ from the number of output optical fibers 25.

Optical switch 10 may further include input optical fibers 22-1 to 22-N (collectively "input optical fibers 22") and one or more output optical fibers 27-1 to 27-N (collectively "output optical fibers 27"). The number of input optical fibers 22 and the number of output optical fibers 27 may differ, of course. Input optical fibers 22 and output optical fibers 27 may be used for alignment purposes, as discussed further below. In the embodiment shown in FIG. 2, fibers 22 and 27 are coupled to light source 34 and to detectors 33, as shown schematically in FIG. 2. Light source 34 launches optical signals into fibers 22 and 27. Light source 34 may be for example, a light-emitting diode, a laser, or other light source, or a group of such devices provided for fibers 22 and 27. For example, one or more fibers 22, 27 may be coupled to each such device. Detectors 33 detect optical signals propagating in fibers 22 and 27 in a direction opposite to the optical signals output from light source 34.

The input optical fibers 20, 22 and output optical fibers 25, 27 may be arranged in any way, for example a rectangular array, such as a square array. Alternatively, input optical fibers 22 may be provided outside of or interspersed within an array of fibers 20. Similarly, output fibers 27 may provided outside of or interspersed within an array of fibers 25. In an exemplary embodiment, fibers 22 and 27 are provided at the periphery of the arrangement of fibers.

The input optical fibers 20, 22 carry optical signals that are supplied, respectively, to a lens array 30. Together, the fibers 20, 22 and lens array 30 may be considered a fiber/lens array. The lens array 30 may include a plurality of micro-lenses 32 arranged in an array. The micro-lenses 32 are preferably arranged so that each input optical fiber 20 and 22 is aligned with a micro-lens 32. In this way, optical signals emitted from an input fiber 20, 22 will pass through one of the micro-lenses 32. Alternatively, the lens array 30 may be integrated with the ends of fibers 20, 22. The micro-lenses 32 direct optical beams from the input optical fibers 20 to a first switching substrate 100a, which will be described in greater detail below.

The first switching substrate 100a includes a plurality of static micro-mirrors 112a-1 to 112a-N (collectively referred to as "static mirrors 112a") and a plurality of switching elements 120. The switching elements 120 may be arranged in an array, e.g., a rectangular or square array. Static mirrors 112a may be arranged at the periphery of the array of switching elements 120 or interspersed within the array of switching elements 120. Alternatively, the static mirrors 112a and switching elements 120 may together form an array, e.g., a rectangular or square array. Of course, other arrangements of the static mirrors 112a and/or switching elements 120 may be used as well.

According to one embodiment of the invention, the static mirrors 112a are set at a fixed angle $\alpha 1$ relative to the surface normal of the switching substrate 100a. The fixed angle $\alpha 1$ equals to the desired angular orientation of the fiber/lens array and the switching substrate 100a. Depending on the implementation, angle $\alpha 1$ may be, for example, between 15°–30°. According to one embodiment, angle $\alpha 1$ may be between 20°–25°. The desired angle $\alpha 1$ may depend on a number of factors, and the above are intended as examples. Preferably, angle $\alpha 1$ may be selected to achieve low optical loss.

When lens array 30 and switching substrate 100a are properly aligned, optical signals from input optical fibers 22 pass through lenses 32, strike static mirrors 112a, and are back-reflected back through lenses 32 and into fibers 22, and are detected by detectors 33. If the switching substrate 100a and lens array 30 are misaligned, light from at least one fiber 22 and emitted from a lens 32 will not be reflected back into the fiber 22 by static mirrors 112a. Accordingly, detectors 33 will not detect back-reflected light from static mirrors 112a in each of the fibers 22.

The switching elements 120 of switching substrate 100a may include, for example, movable micro-mirrors. In a preferred embodiment, each input optical fiber 20 corresponds to one micro-lens 32 of the first lens array 30 and one micro-mirror switching element 120 of the first switching substrate 100a. Using the switching elements 120 and responsive to control signals, the first switching substrate 100a couples the optical signals from the fibers 20 to selected switching elements 120 of a second switching substrate 100b.

The second switching substrate 100b includes static micro-mirrors 112b-1 to 112b-N (collectively "static mirrors 111b") and switching elements 120. Similar to the first substrate 100a, the switching elements 120 of the second substrate 100b may be arranged in an array, e.g., a square or rectangular array or other arrangement. Static mirrors 112b may be arranged at the periphery of the substrate 100b or interspersed therein. Alternatively, the static mirrors 112b and switching elements 120 may together form an array, such as a rectangular array. As above, the static mirrors 112b and switching elements 120 may form other patterns on substrate 100b. The second substrate 100b need not match the first substrate 100a.

Static mirrors 111b may be, for example, set to a fixed angle α2 equal to the desired angular orientation between the second switching substrate 100b and the fiber/lens array 35. As above, the angle α2 may depend on a number of factors, such as switch size, the number of switching elements, among other things, and is preferably selected to achieve low optical loss. Depending on the implementation, angle α2 may be, for example, between 15°–30°. According to one embodiment, angle α2 may be between 20°–25°. Therefore, lens array 35 and switching substrate 100b are properly aligned, optical signals from output optical fibers 27 pass through lenses 32, strike static mirrors 112b, at least a portion of the incident optical signals are reflected back through lenses 32 and into fibers 27, and are detected by detectors 33. If the switching substrate 100b and lens array 35 are misaligned, light from at least one fiber 27 and emitted from a lens 32 will not be reflected back into the fiber 27 by a static mirror 112b. Accordingly, detectors 33 will not detect back-reflected light from static mirrors 112b in each of the fibers 27.

Switching elements 120 of substrate 100b may include, for example, movable micro-mirrors. In a preferred embodiment, each output optical fiber 25 corresponds to one micro-lens 32 of the second lens array 35 and one micro-mirror switching element 120 of the second switching substrate 100b. Using the micro-mirror switching elements 120 and responsive to control signals, the second switching substrate 100b couples optical signals from the first switching substrate 100a to output fibers 25.

In one embodiment, each switching element 120 of the first substrate 100a is preferably movable or otherwise controllable to permit an input beam to be coupled (e.g., reflected) by the switching element 120 to any switching element 120 of the second substrate 100b. The switching elements 120 of the second substrate 100b, also responsive to control signals, receive and couple the optical beams through the second lens array 35 to output optical fibers 25. The second lens array 35 includes micro-lenses 32, which may be arranged in an array, aligned with output optical fibers 25 and 27. Alternatively, lenses 32 may be integrated with the ends of fibers 25 and 27. In any case, the fibers 25, 27 and lens array 35 may be considered a fiber/lens array. Micro-lenses 32 direct the optical beams into output optical fibers 25 and into and out of fibers 27. Accordingly, optical signals carried on input optical fibers 20 may be selectively coupled to output optical fibers 25.

A controller 50 may be used to receive and process sensor signals (e.g., from the detectors 33 and/or from the switching substrates 100a, 100b) and other control inputs and generate output control signals to control the position of the switching elements 120 of the first and second substrates 100a, 100b. The switching substrates 100a and 100b can be controlled to redirect or switch the coupling of optical signals. For example, as shown in FIG. 2, switching element 120-1 of substrate 100a directs an optical signal to switching element 120-(k+1) of substrate 100b. However, responsive to control signals, switching element 120-1 of substrate 100a may redirect the optical signal it receives from input optical fiber 20-1 to switching element 120-2 of substrate 100b. Switching element 120-2 may be controlled to receive the optical signal and provide it to optical fiber 25-2. The controller 50 may be, for example, a computer or application-specific circuitry.

Controller 50 may also generate control signals indicating whether or not the lens array 30 is aligned with the first substrate 100a and whether the lens array 35 is aligned with the second substrate 100b based on inputs received from detectors 33. Of course, a separate controller may be used for this purpose. The control signals may be simply information signals indicating alignment or misalignment. Alternatively, the control signals may indicate the direction and displacement needed to bring the lens arrays 30, 35 into alignment with their respective substrates 100a, 100b. A motor mechanism (not shown) may be provided for each of the first lens array/first switching substrate and the second lens array/second switching substrate. The motor mechanism may be responsive to the control signals of the controller 50 to move one or both the lens array 30 (35) and substrate 100a (100b) into alignment. In this way, the combination of lens array/switching substrate may be automatically aligned.

While FIG. 2 shows a one-stage switching arrangement, one or more additional stages of substrates may be interposed between substrates 100a and 100b to form a multi-stage switching arrangement.

Figure 3:
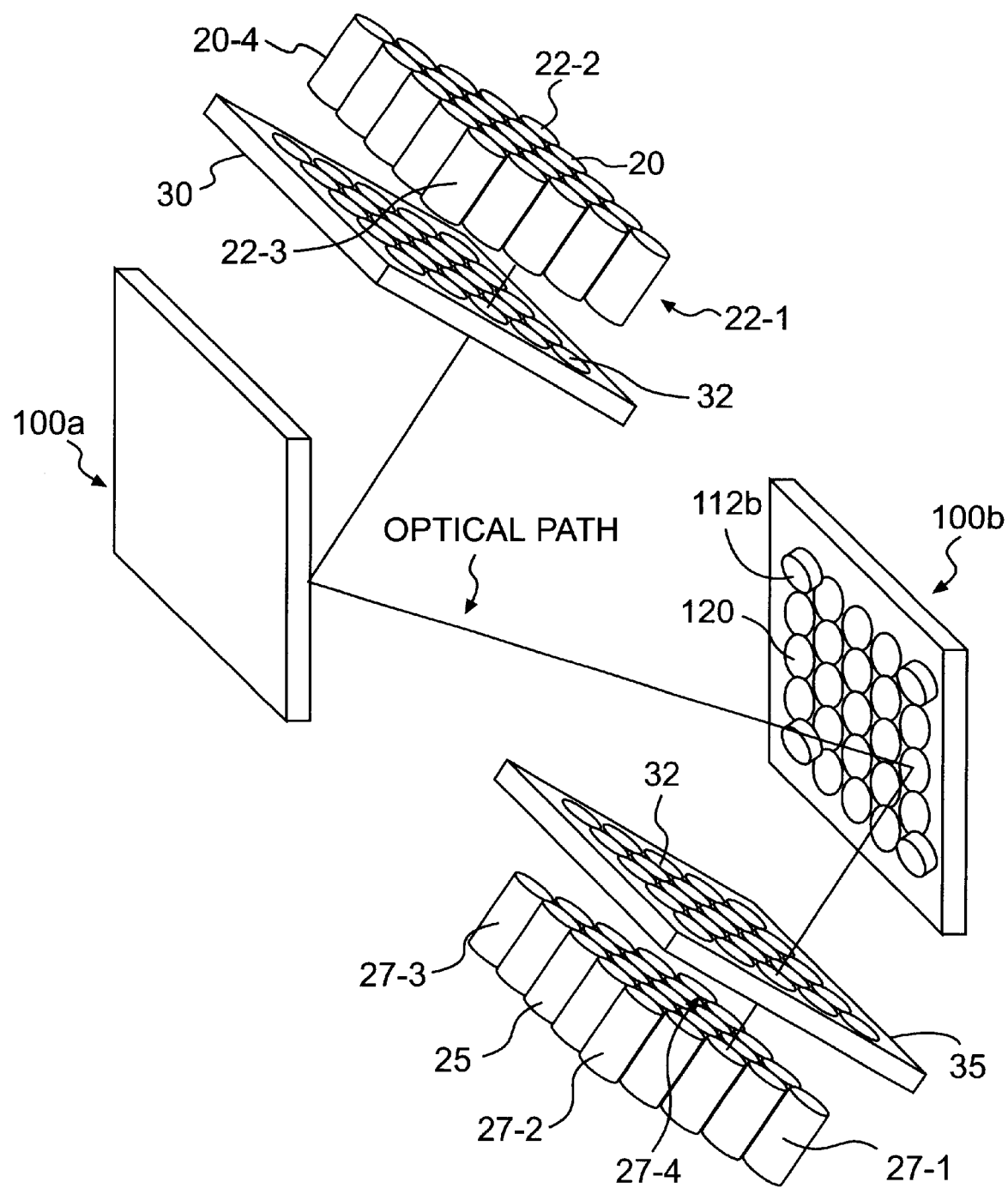
FIG. 3 illustrates an embodiment of an exemplary optical switch having micro-mirrors in accordance with the present invention.

FIG. 3 provides an example of an embodiment of an optical switch 10 according to the schematic of FIG. 2. As shown in FIG. 3, the input optical fibers 20 and 22 together form a two-dimensional rectangular array. In particular, input optical fibers 22-1 to 22-4 are provided at the corners of the array with input optical fibers 20 making up the remainder of the array. Of course, the arrangement of input optical fibers 20 and 22 shown in FIG. 3 is exemplary and other patterns may be used consistent with the present invention. Similarly, output optical fibers 25 and 27 together form a two-dimensional rectangular array in which fibers 27-1 to 27-4 are provided at the corners. Lens arrays 30 and 35 include micro-lenses 32 arranged in arrays and desirably aligned with the input optical fibers 20, 22 and the output optical fibers 25, 27, respectively.

Static mirrors 112b and switching elements 120 of the second switching substrate 100b are arranged in a rectangular array, with the static mirrors 112b at the corners. Static mirrors 112a and switching elements 120 are similarly situated on the first switching substrate 100a. The switching substrate 100a is desirably positioned at an angle α1 with respect to lens array 30. That is, a ray taken normal from the surface of lens array 30 will strike switching substrate 100a at an angle α1 from normal. Switching substrate 100a generally faces the second switching substrate 100b with some offset. The second switching substrate 100b is desirably positioned at an angle α2 with respect to the second lens array 35. In a preferred embodiment, α1 and α2 are equal. Accordingly, an optical path from an input fiber 20 to an output fiber 25 traverses a generally "Z" shaped path, as illustrated in FIG. 3.

Static mirrors 112a preferably form an angle α1 relative to the surface normal of the first switching substrate 100a and are normal to the lens array 30 when the lens array 30 and switching substrate 100a are properly positioned. Similarly, static mirrors 112b preferably form an angle α2 relative to the surface normal of the first switching substrate 100b and are normal to the lens array 35 when the lens array 35 and switching substrate 100b are properly positioned. Accordingly, when properly positioned and aligned, static mirrors 112a will reflect light from lenses 32 of lens array 30 back into lenses 32 and fibers 22 and static mirrors 112b will reflect light from lenses 32 of lens array 35 back into lenses 32 and fibers 27. Of course, static mirrors 112a, 112b may be set so as to form any fixed relationship between the lens array and the detector location.

Static mirrors 112a, 112b may be used to align the fiber/lens arrays 30, 35 with the switching substrates 100a, 100b so that fibers 20, 25 are aligned with the micro lenses 32 of the fiber/lens arrays 30, 35. For example, the optical signal from fibers 20 should pass through the respective micro-lenses of lens array 30 and center on the micro-mirrors 122 of the switching substrate 100a. Alignment may be performed using real-time control.

To position lens array 30 and switching substrate 100a, an optical signal source 34, such as a light emitting diode, a laser, or other signal source, is coupled to the ends of fibers 22. As noted above, a single optical signal source 34 may be used to generate light for each of fibers 22 or separate optical sources 34 may be used for each fiber 22. The optical signals are emitted from the ends of fibers 22 and collimated by micro-lenses 32. Lens array 30 and switching substrate 100a are moved relative to each other (e.g., by moving lens array 30, substrate 100a or both) until the optical signals are reflected back into the fibers 22 by static mirrors 112a. The reflected light may be detected by detectors 33 (as shown, for example, in FIG. 2). The lens array 30 and switching substrate 100a are properly aligned when detectors 33 detect reflected signals of predetermined intensity or power from each of fibers 22-1 and 22-4. The predetermined power may be, for example, a maximum power determined during alignment or power that exceeds a predetermined threshold. Lens array 35 and switching substrate 100b may be aligned in a similar manner.

Once properly aligned, the optical switch 10 may be used to selectively couple optical signals from input fibers 20 to selected output fibers 25. As shown in FIG. 3 with a single optical beam, the first lens array 30 receives the input optical beam from the input optical fibers 20 at a micro-lens 32 and directs the input beam to a switching element 120 of the first switching substrate 100a. Depending on the angular position of the switching element 120, the input optical beam is reflected to a selected switching element 120 of the second substrate 100b. The switching element 120 of the second substrate 100b reflects the input optical beam through a lens 32 of the second lens array 35 to a selected one of the output optical fibers 25. Thus, the optical beam passes out of the input optical fiber 20, passes through a lens 32 of the first lens array 30, is reflected by switching elements of the first and second switching substrates 100a, 100b, passes through a lens 32 of the second lens array 30, and is directed into a selected output optical fiber 25.

In a preferred embodiment, switching substrates 100a and 100b are microelectromechanical system (MEMS) devices. Switching elements 120 may be movable micro-mirrors. For example, switching elements 120 may be gimbaled micro-mirrors capable of pivoting about at least two axes. The axes may be perpendicular to each other. According to one embodiment, static mirrors 112a are preferably formed on switching substrate 100a so that the surface normal from the mirrors 112a are coincident with the surface normal of lens array 30 and at an angle α1 with respect to the surface of the substrate 100a. Similarly, static mirrors 112b may be provided on switching substrate 100a so that the surface normal from the mirrors 112b are coincident with the surface normal of lens array 35 and at an angle α2 with respect to the surface of the substrate 100b. Static mirrors 112a and 112b may be formed on the substrates 100a, 100b, respectively, using lithographic processing techniques used in the semiconductor arts. Alternatively, static mirrors may be formed separately and applied to the substrates.

Figure 4:
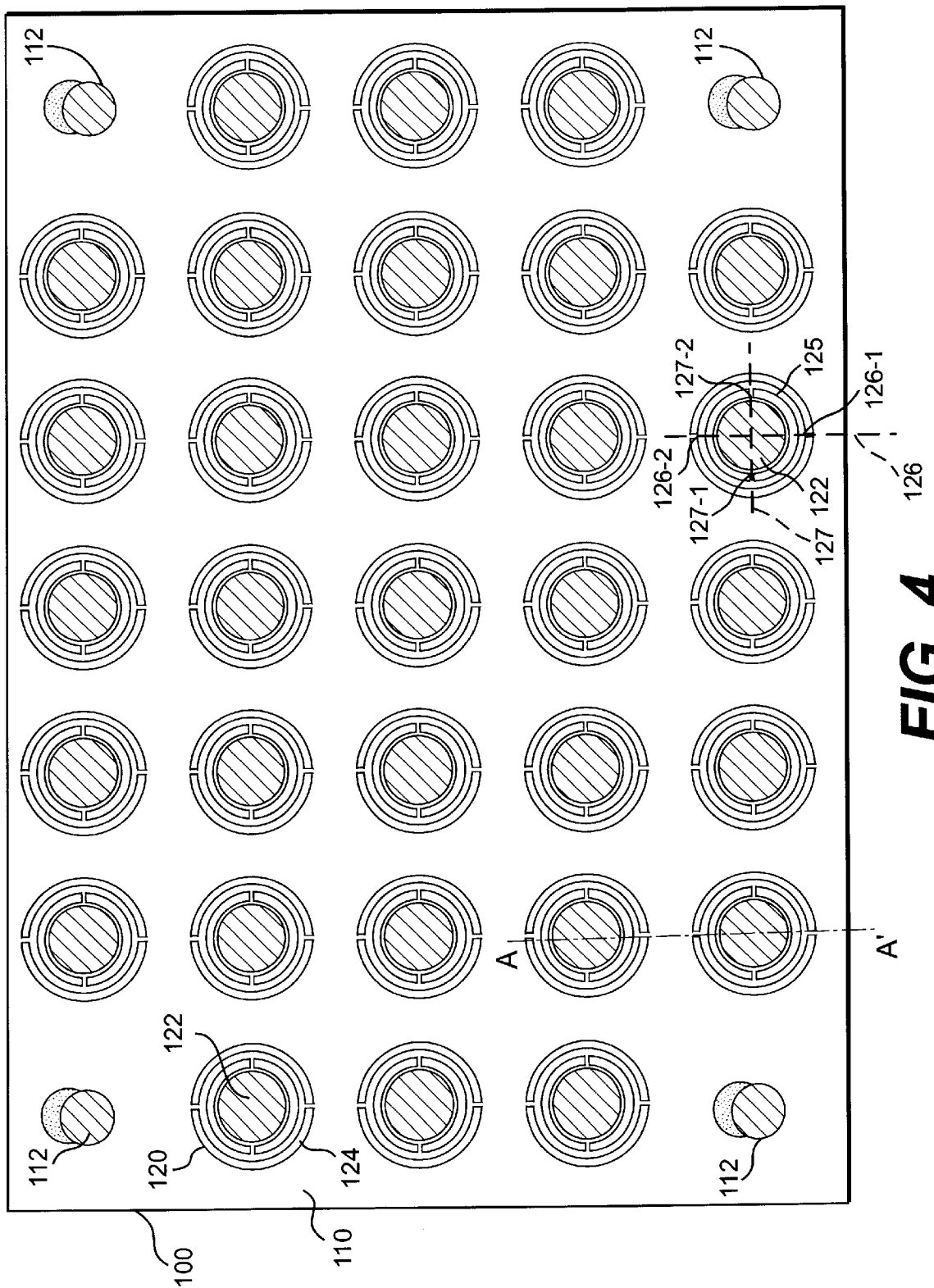
FIG. 4 illustrates exemplary embodiment of a MEMS array substrate for an optical switch in accordance with the present invention.
Figure 5:
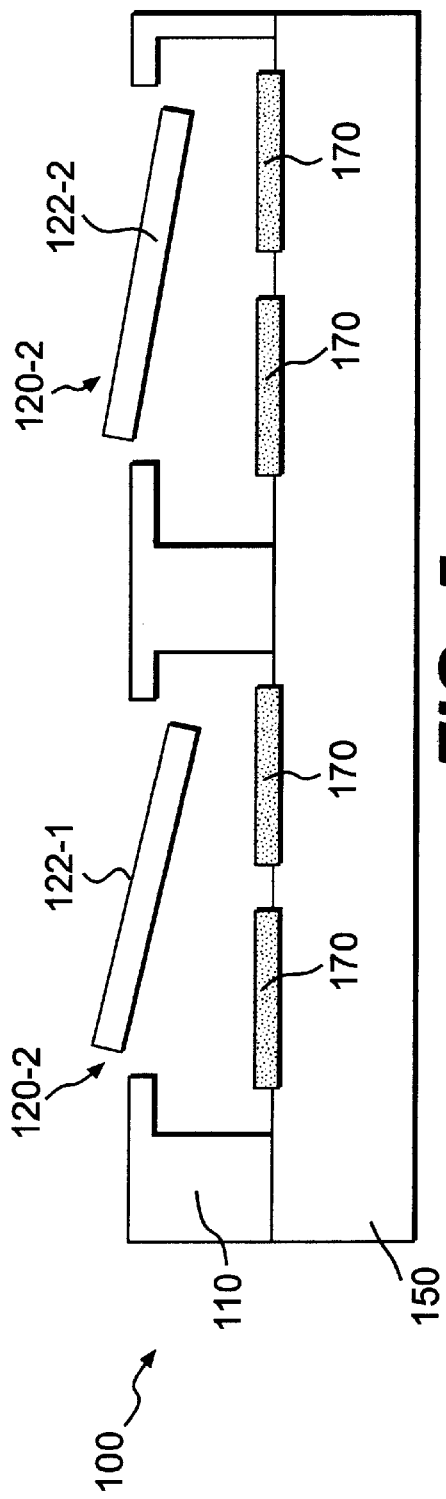
FIG. 5 illustrates a partial cross-section of the embodiment of the MEMS array substrate of FIG. 4.

FIGS. 4 and 5 illustrate a top view and a cross sectional view of an exemplary embodiment of a MEMS micro-mirror substrate 100 in accordance with the present invention. In particular, FIG. 5 represents a partial cross section of the MEMS micro-mirror substrate 100 of FIG. 4 taken along an axis A–A'. As should be apparent, FIGS. 4 and 5 provide simplified illustrations of MEMS micro-mirror substrate 100 for explaining the invention. While FIGS. 4 and 5 described the switching substrate 100 formed using MEMS technology, it should be appreciated that this is exemplary and other technologies may be used consistent with the present invention.

The substrate 100 includes a base 110, which may be formed, for example, of single-crystalline silicon, on which a plurality of static mirrors 112 and micro-mirrors 122 are formed in an array. More particularly, the base 110 includes a plurality of micro-mirrors 122 and corresponding mirror mounts 124 for mounting the micro-mirrors 122. The micro-mirrors 122 may be formed with a gold coating, for example, to provide a reflective surface. Each micro-mirror 122 and corresponding mirror mount 124 form a movable micro-mirror switching element 120. In FIG. 4, the static mirrors 112 having a smaller diameter than the micro-mirrors 122 to provide better spatial resolution. However, the static mirrors 112 may have different sizes and/or shapes. FIG. 4 shows four static mirrors 112 and thirty-one movable micro-mirror switching elements 120 for purposes of illustration. Of course, the switching substrate 100 may have more or fewer than four static mirrors 112 and/or more or fewer that thirty-one movable micro-mirror switching elements 120.

As shown in FIG. 4, each mirror mount 124 may be formed as a gimbal. In particular, the mirror mount 124 includes a mounting arm 125 coupled to the remainder of the base 110 by pivot arms 126-1, 126-2 and coupled to the micro-mirror 122 by pivot arms 127-1, 127-2. Pivot arms 126-1 and 126-2 enable the mounting arm 125, and thus the micro-mirror 122, to pivot with respect to the substrate 110 about a first axis 126. Pivot arms 127-1 and 127-2 enable the micro-mirror 122 to pivot with respect to the mounting arm 125 about a second axis 127 orthogonal to the first axis 126. FIG. 4 shows the mounting arm 125 to be circular for purposes of illustration and not by way of limitation. Of course, the mounting arm 125 may be, for example, rectangular, elliptical, or other closed loop shape, or U-shaped, or arcuate.

The micro-mirror substrate 100 further includes a sub-mount 150 beneath the base 110. The sub-mount 150 may be formed, for example, of silicon or another semiconductive material or compound, or an insulative material on which a semiconductive material or compound may be formed. FIG.

Figure 6:
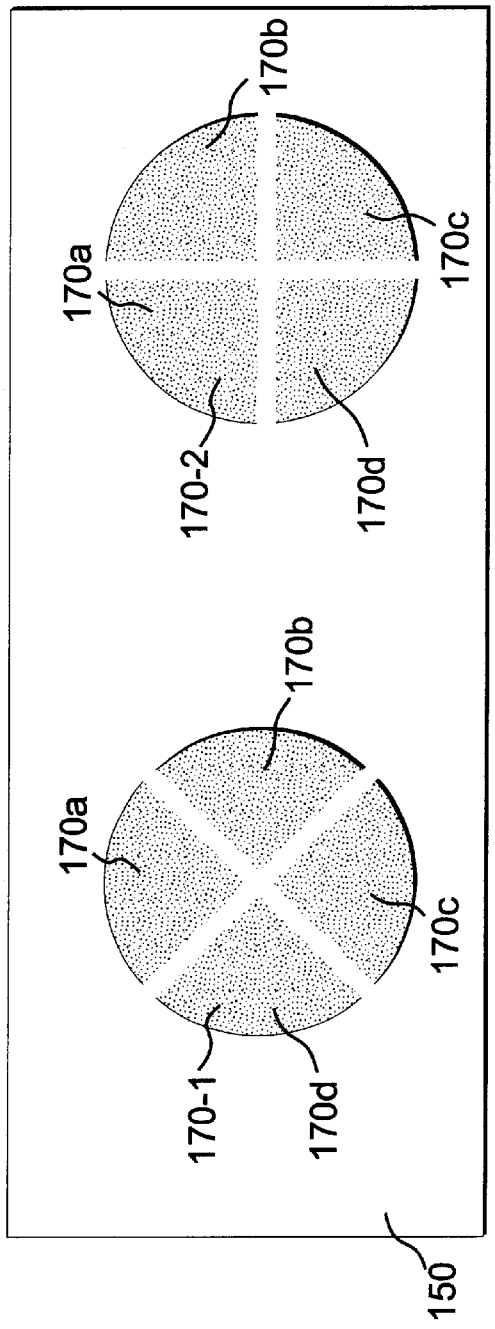
FIG. 6 illustrates a partial top view of an exemplary sub-mount of the MEMS array substrate of FIG. 4.

6 illustrates a top view of a portion of sub-mount 150 in accordance with an exemplary embodiment of the invention. As shown in FIGS. 5 and 6, the sub-mount 150 includes a plurality of electrodes 170 arranged in groups 170-1, 170-2 corresponding to the movable micro-mirror assemblies 120-1, 120-2 and, in particular, to the micro-mirror 122-1, 122-2 and mounting arm 125 of the movable micro-mirror switching elements 120. Group 170-1 and group 170-2 represent two of several possible orientations of the electrodes 170 relative to the axes 126 and 127. Of course, groups of electrodes 170 of a given sub-mount 150 may have a single orientation or multiple different orientations. Electrodes 170 act on the micro-mirror 122 and mounting arm 125 to control the angular position of the micro-mirror 122 by electrostatic force, for example. In the embodiment of FIGS. 4–6, the electrodes 170a and 170c of electrode group 170-1 control the angular position of the micro-mirror 122-1 about axis 127. Electrodes 170b and 170d of group 170-1 control the angular position of the micro-mirror 122-1 about axis 126. With respect to electrode group 170-2, electrode pairs 170a,170d and electrode pairs 170b,170c control the angular position of the micro-mirror 122-2 about axis 126. Electrode pairs 170a, 170b and electrode pairs 170c,170d of group 170-2 control the angular position of the micro-mirror 122-2 about axis 127. Consequently, by appropriate control of electrodes 170a–170d, the surface angle of micro-mirror 122 may be controlled. Accordingly, the micro-mirror 122 can be used to steer an incident light beam to a particular location, a function useful in optical switches. The design of electrodes 170 in FIG. 6 is intended to be exemplary. It should be understood that other electrode designs may be used in connection with the present invention.

Control circuitry for driving the electrodes 170 may employ analog and/or digital designs. The control circuitry 50, or a portion thereof, may be integrated into the sub-mount 150 or may be provided by one or more separate driver chips. Optical switch 10, and in particular substrates 100a and 100b and lens arrays 30 and 35 may include additional features to facilitate alignment and to facilitate positioning control of the micro-mirrors 122.

Figure 7:
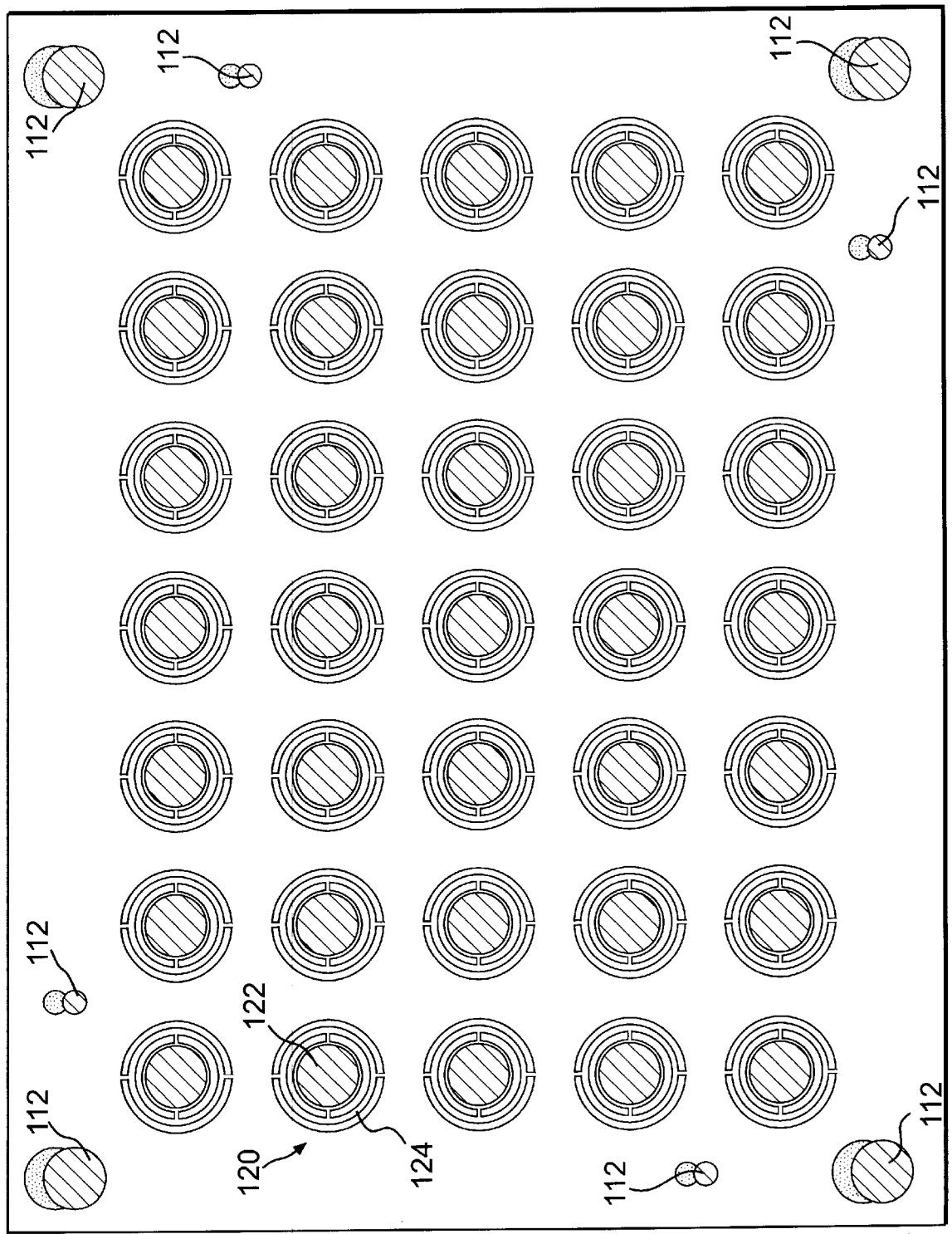
FIGS. 7–9 illustrate further exemplary embodiments of a MEMS array substrate for an optical switch in accordance with the present invention.
Figure 8:
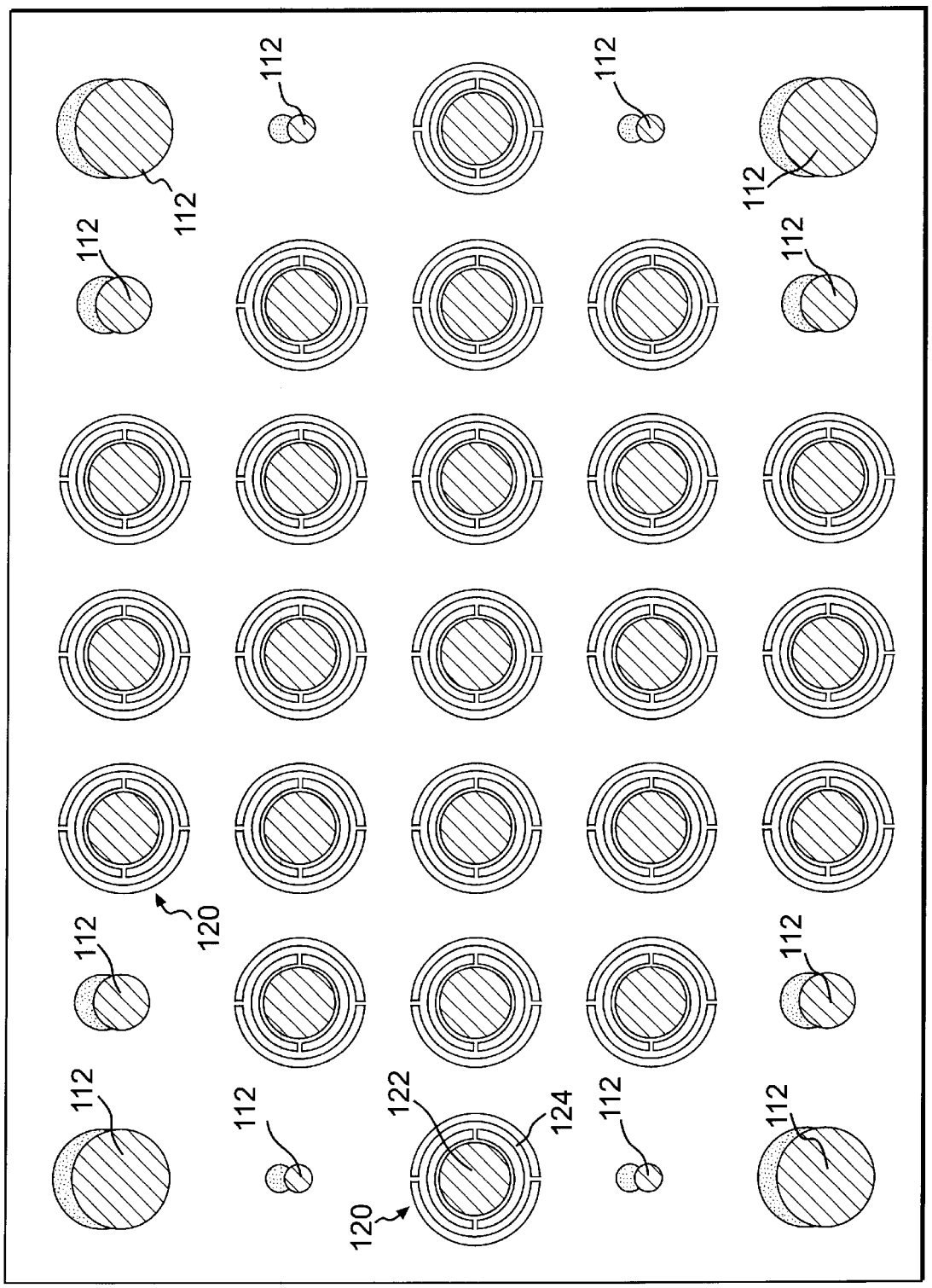
Figure 9:
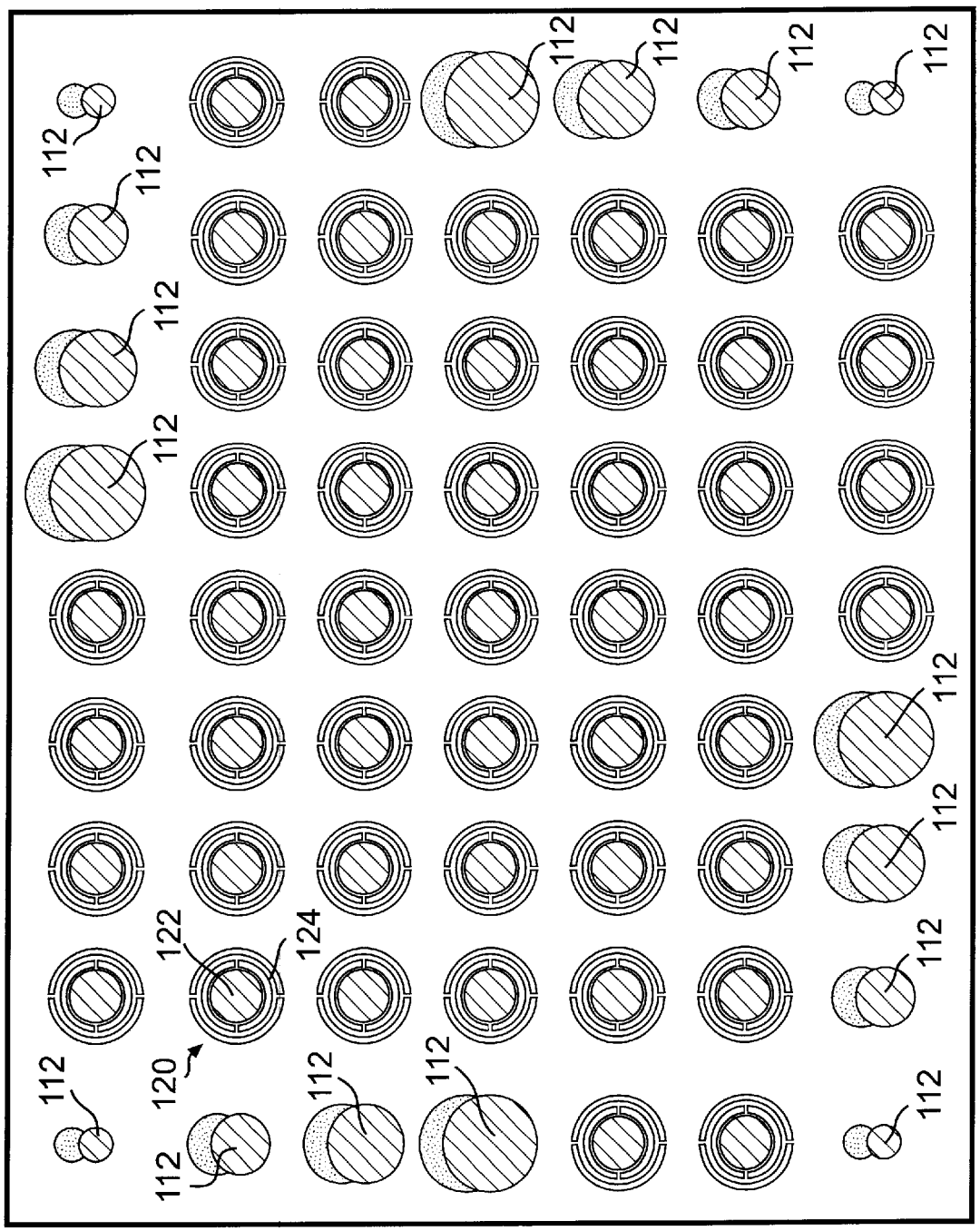

FIGS. 7–9 illustrate alternative arrangement of the static mirrors 112 on the surface of switching substrate 100. As shown in FIG. 7, the static mirrors 112 may have different sizes and may be distributed on the surface of the switching substrate 100 outside of an array of switching elements 120. FIG. 7 illustrates two different sizes of static mirrors 112. The larger static mirrors 112 may be substantially larger than the waist of the incident beam of light. Accordingly, the larger static mirrors may be used for coarse position adjustments. The smaller static mirrors 112 may be sized to be approximately the same size as or smaller than the beam waist of the incident light and may be used for fine position adjustments.

FIG. 8 is similar to FIG. 7. FIG. 8 includes three different sizes of static mirrors 112 that are incorporated into the array of switching elements 120. FIG. 9 illustrates four different sizes of static mirrors 112 incorporated into the array of switching elements 120 on the surface of the switching substrate 100. It should be clear that the switching substrate may be provided with a variety of sizes and shapes static mirrors provided in various arrangements. Foe example, the static mirrors 112 may have other shapes or configurations, for example, to produce diffraction effects, as a reflective grating. For example, a grating may have linear grooves or curved grooves, for example, concentric circular grooves.

Figure 10A:
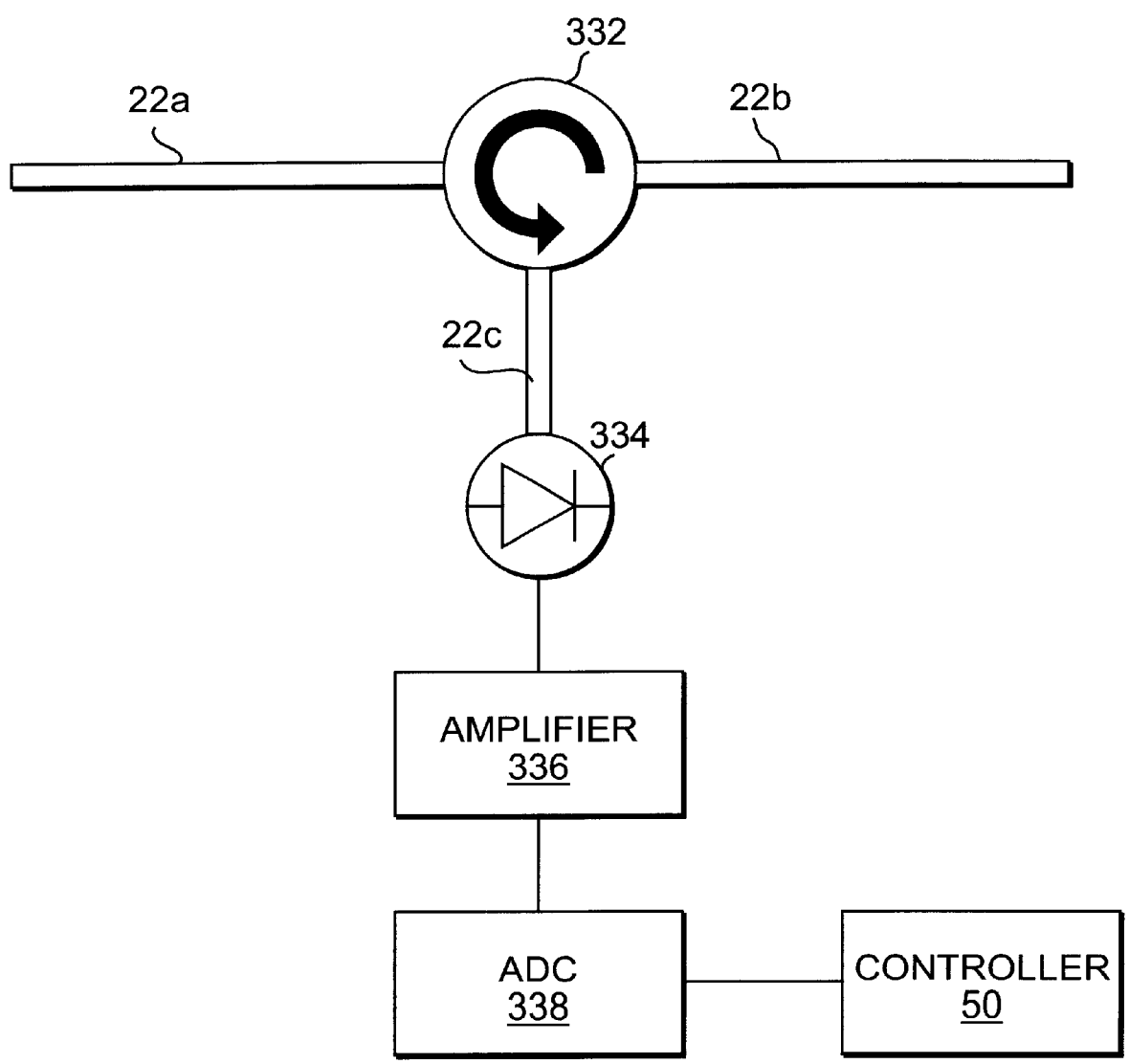
FIG. 10A illustrates a schematic of a first exemplary optical detector arrangement in accordance with the present invention.

FIG. 10A illustrates an exemplary arrangement for detecting back reflected light in a fiber 22. As shown in FIG. 10A, fiber 22 includes a segment 22a having a first end that is aligned or integrated with a micro-lens 32. A second end of segment 22a couples to an optical circulator 332. Circulator 332 also couples to ends of segments 22b and 22c. A second end of segment 22b couples to a light source (e.g., a light-emitting device, such as a laser). A second end of fiber 22c couples to a photodetector 334, such as a PIN diode or a metal-semiconductor-metal (MSM) diode detector. The photodetector 334 is coupled to an amplifier 336, which couples to an analog-to-digital converter (ADC) 338. ADC 338 couples to controller 50, for example.

In operation, light generated by the light source is coupled to the circulator 332 by segment 22b. Circulator 332 couples the light from segment 22b to segment 22a, which couples the light to lens 32. Back-reflected light from segment 22a is coupled by circulator 332 to segment 22c. Photodetector 334 detects the back-reflected light on segment 22c. For example, photodetector 334 may generate an electric current indicative of the power of the back-reflected light. Amplifier 336 may be provided to amplify the output of photodetector 334. Amplifier 336 may be a transimpedance amplifier that generates a voltage signal based on an input from photodetector 334. An ADC 338 may convert the voltage of the amplifier 336 to a digital signal, which may be supplied to controller 50. Based on the output of the ADC 338, the controller 50 can determine whether the lens array and switching substrate 100 are properly aligned. For example, the controller 50 may determine that the substrate and lens array are properly aligned if a predetermined power level of back reflected light is detected in each fiber 22. Of course, the photodetector 334, the amplifier 336, or the ADC 338 may provide an output to a display or meter that a technician may use in aligning the fiber/lens array and the switching substrate.

Figure 10B:
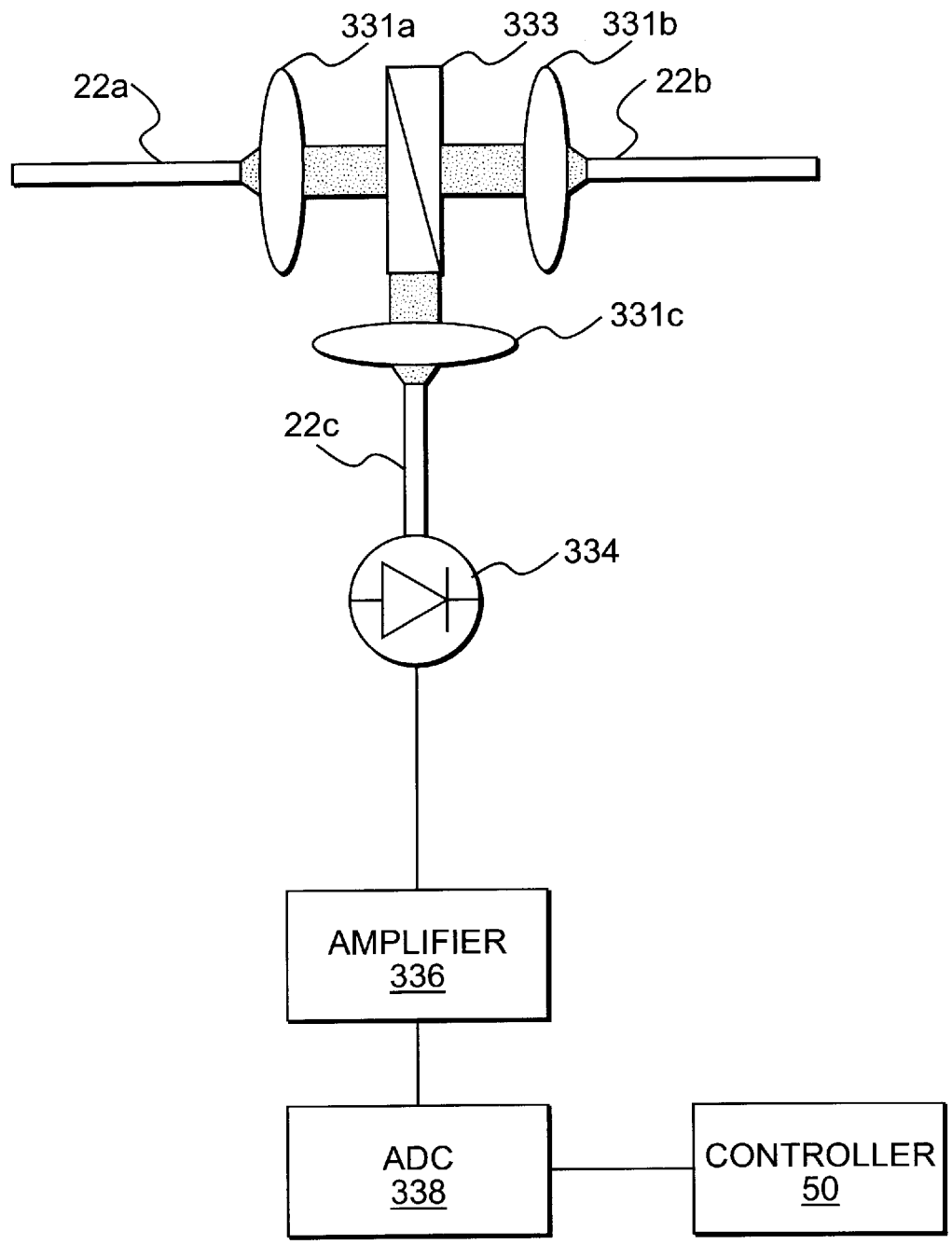
FIG. 10B illustrates a schematic of a second exemplary optical detector arrangement in accordance with the present invention.

FIG. 10B illustrates another exemplary arrangement for detecting back reflected light in a fiber 22. In accordance with FIG. 10B, fiber segment 22a includes a first end aligned or integrated with a micro-lens 32 and a second end aligned or integrated with a lens 331a. Fiber segment 22b includes a first end coupled to a light source (not shown) and a second end aligned or integrated with a lens 331b. A beam splitter 333 is provided between lens 331a and lens 331b. A lens 331c is also provided in alignment with beam splitter 333. Lens 331c may be aligned or integrated with fiber segment 22c. The remainder of the detector arrangement may be the same or similar to that described in FIG. 10A.

In operation, light generated by the light source is coupled to the lens 331b by segment 22b. The light passes through the beam splitter 333 and is inserted into segment 22a by lens 331a. Segment 22a couples the light to a lens 32 of lens array. Back-reflected light from segment 22a is coupled to beam splitter 333 through lens 331b. The beam splitter 333 reflects the back-reflected light into segment 22c through lens 331c. Photodetector 334 detects the back-reflected light. A signal indicative of the back reflected light may be supplied to controller 50. Based on the output of the signal, the controller 50 can determine whether the lens array and switching substrate 100 are properly aligned.

Figure 11A:
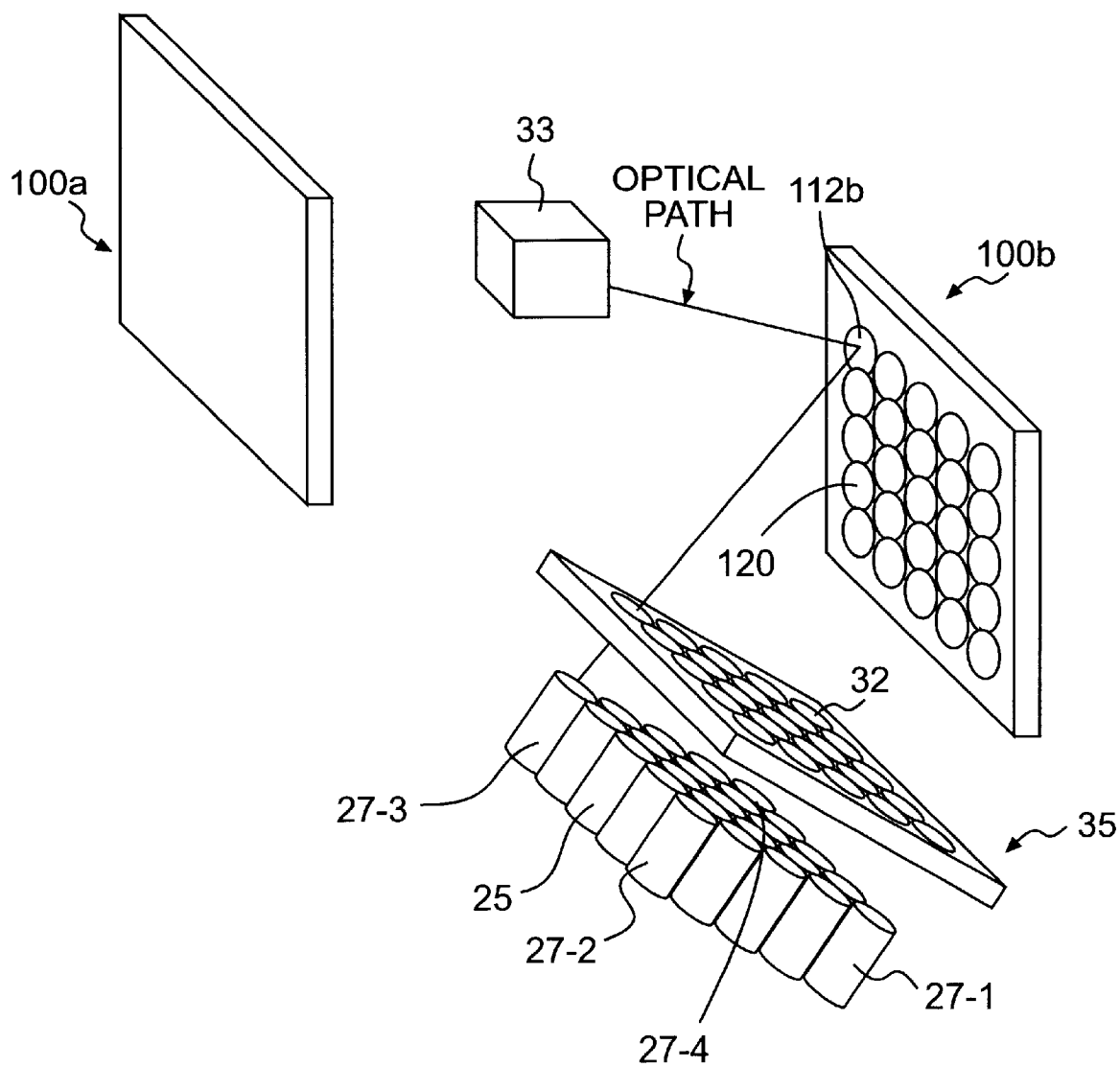
FIG. 11A illustrates a schematic of a third exemplary optical detector arrangement in accordance with the present invention.
Figure 11B:
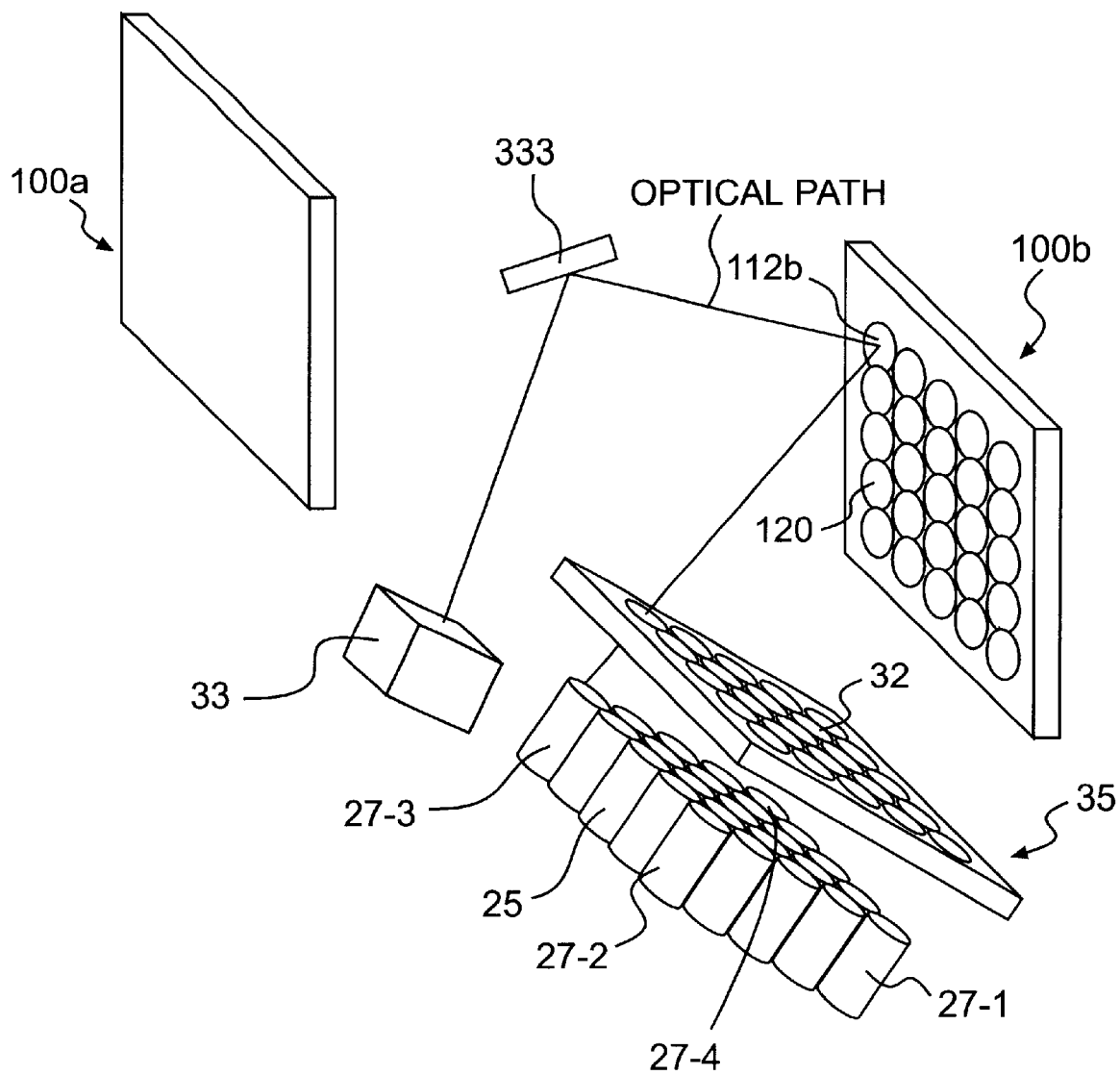
FIG. 11B illustrates a schematic of a fourth exemplary optical detector arrangement in accordance with the present invention.

The detector arrangements of FIGS. 10A and 10B are intended to be illustrative. Of course, other mechanisms may be provided for detecting the back reflected light. FIG. 11A and 11B provide examples of arrangements in which the static mirror 112 is provided at an angle that will not reflect optical signals back into the fibers 22, 27 when the fiber/lens array and switching substrate are properly aligned. FIGS. 11A and 11B illustrate an arrangement for aligning lens array 35 and switching substrate 100b, but a similar arrangement may be used to align lens array 30 and switching substrate 100a.

As shown in FIG. 11A, a detector 33 may be positioned at a desired location, for example, between switching substrates 100a and 100b, so that an optical signal from a fiber 27 will pass through a micro-lens 32, strike a static mirror 112, and be reflected to the detector 33. Detector 33 may be any light sensitive device, such as a camera, charge coupled device (CCD), photodetector, photodiode, or photodiode array, etc. The specific position of the detector 33 depends on the angle of the static mirror 112 relative to the desired angle of incidence of the optical beam from the lens array 35. Detector 33 is preferably in a fixed position relative to one of the lens array 35 and the switching substrate 100b. For example, if the detector 33 is fixed relative to the lens array 35, the switching substrate 100b may be moved to achieve the desired position relative to the lens array 35. The desired position may be determined when the detector(s) 33 detect a predetermined optical power (e.g., a threshold value or a maximum for the combination of detectors). While FIG. 11A shows a single detector 33 positioned to detect light from static mirror 112b, it should be understood that multiple detectors may be provided, for example, fixed to a substrate. For example, one detector 33 may be provided for each fiber 27 and static mirror 112.

FIG. 11B illustrates a further exemplary embodiment similar to that shown in FIG. 11A. In FIG. 11B, a reflector (such as a beamsplitter 333) may be provided to direct the optical signal reflected by the static mirror to a detector 33. The arrangement of FIG. 11B is otherwise similar to that described in connection with FIG. 11B. As above, a plurality of reflectors and detectors 33 may be provided, for example, one to corresponding to each static mirror 112. Of course, the detectors 33 and/or reflectors may be removed before the optical switch is put into operation.

Figure 11C:
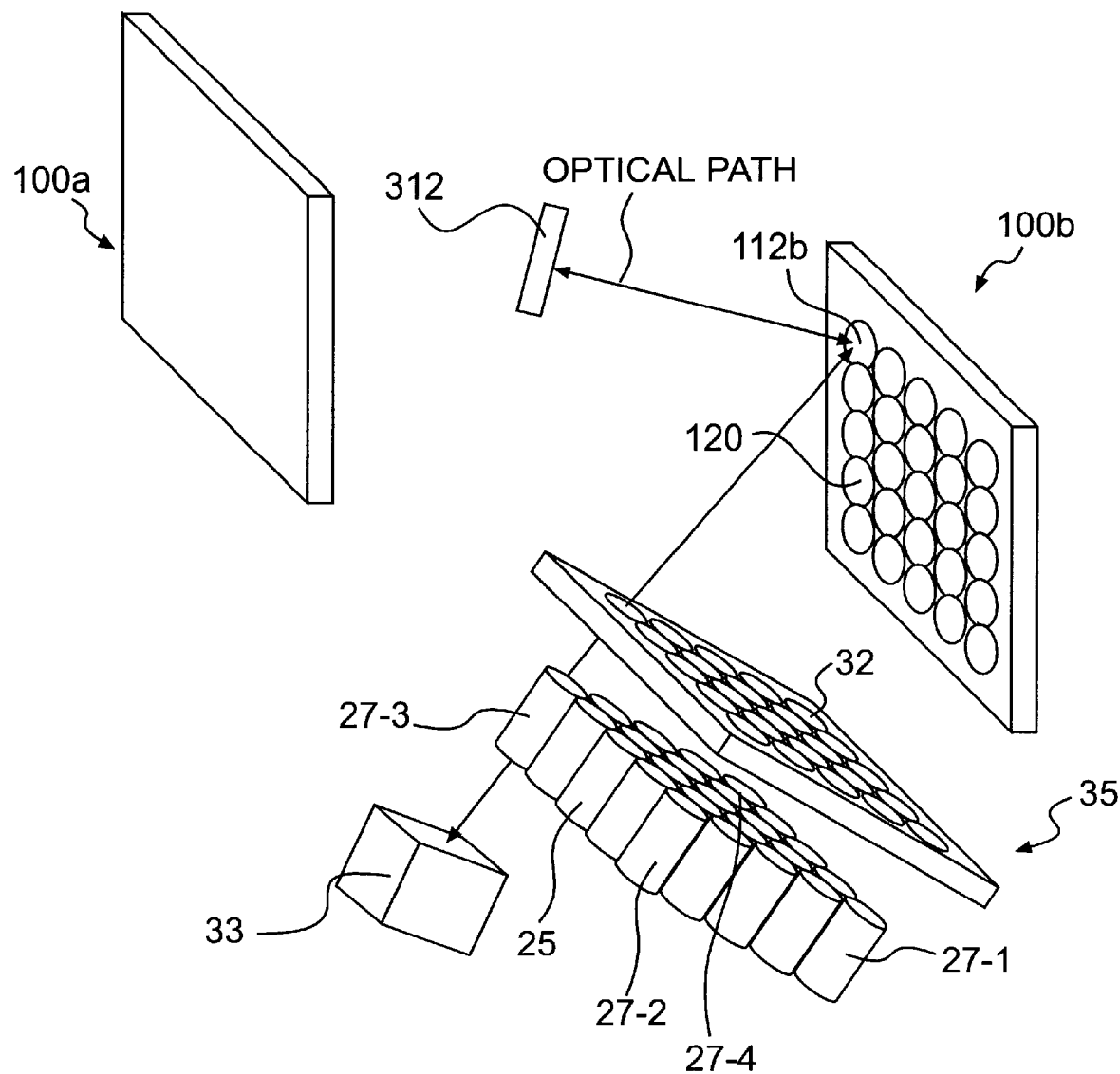
FIG. 11C illustrates a schematic of a fifth exemplary optical detector arrangement in accordance with the present invention.

FIG. 11C illustrates a further exemplary embodiment in which a reflector, such as mirror 312, may be provided to direct the optical signal from the static mirror 112 back to the static mirror 112, back through the micro-lens 32, and back into fiber 27, where the back reflected optical signal may be detected by a detector 33, for example, as described above. According to this embodiment, the static mirrors 112 may be formed on the substrate such that the surface normal of the static mirrors 112 are parallel to the surface normal of the substrate 100. Of course, this is merely an example and the static mirrors may be formed at an angle to the substrate. In the present embodiment, the additional reflector (e.g., mirror 312) is used to back reflect the optical signal reflected from the static mirror 112. As above, a plurality of reflectors and detectors 33 may be provided, for example, one to corresponding to each static mirror 112. Of course, the reflector(s) may be removed before the optical switch is put into operation.

While static mirrors 112 have been described above, it should be clear that the static mirrors may be replaced by movable mirrors (e.g., pivoting mirrors) that may be fixed at a known position.

Figure 12:
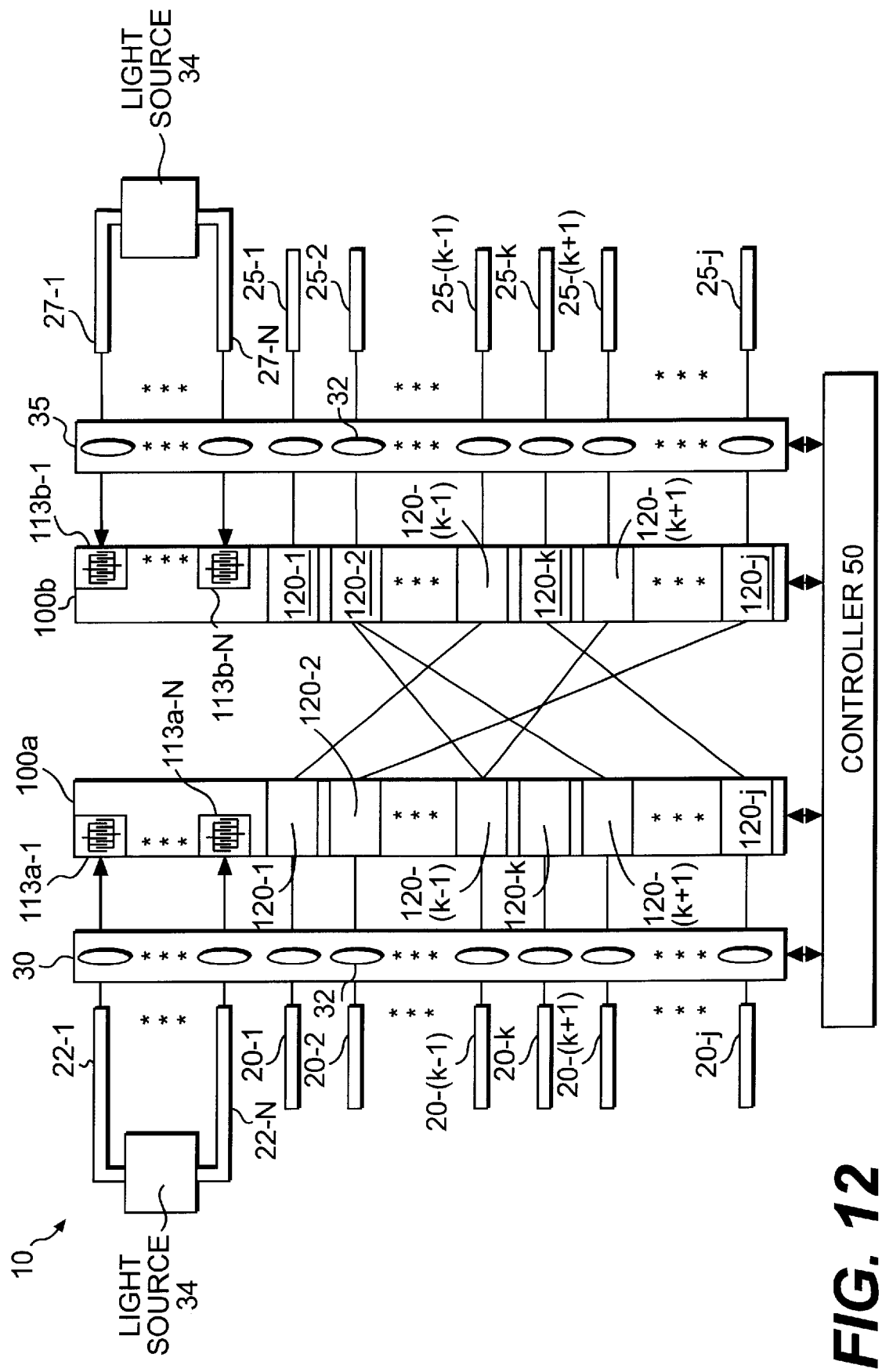
FIG. 12 provides a further schematic of an exemplary optical switch in accordance with the present invention.

FIG. 12 illustrates a schematic a further exemplary embodiment of the present invention. The embodiment of FIG. 10 includes features similar to that of FIG. 2. As shown in FIG. 12, switching substrate 100a includes photodetectors 113a-1 to 113a-N and switching substrate 100b includes photodetectors 113b-1 to 113b-N. The photodetectors 113 may be photodiodes, for example, such as metal-semiconductor-metal photodiodes. Of course, photodetectors 113 may be any type of photodetector or light sensitive device. Photodetectors 113 may be used to align the lens arrays and their respective switching substrates.

Fibers 22 couple light from light source 34 through micro-lenses 32. Light source 34 generates light having a wavelength detectable by the photodetectors 113. For example, light source 34 may produce light having a wavelength of 1.06 μm. Light from the micro-lenses is directed at the switching substrate 100a. Fiber/lens array 30 and/or switching substrate 100a may be moved relative to each other until the light from the micro-lenses 32 is detected by photodetectors 113a. Fine positioning adjustments may be made to maximize the power of light detected by the photodetectors 113a or until a predetermined power threshold is met. When alignment is complete, the fiber/lens array and the switching substrate will be aligned such that light emitted from the fibers 20 will strike the switching elements 120, preferably at the center, within tolerance. Fiber/lens array 35 may be similarly aligned with switching substrate 100b.

Figure 13:
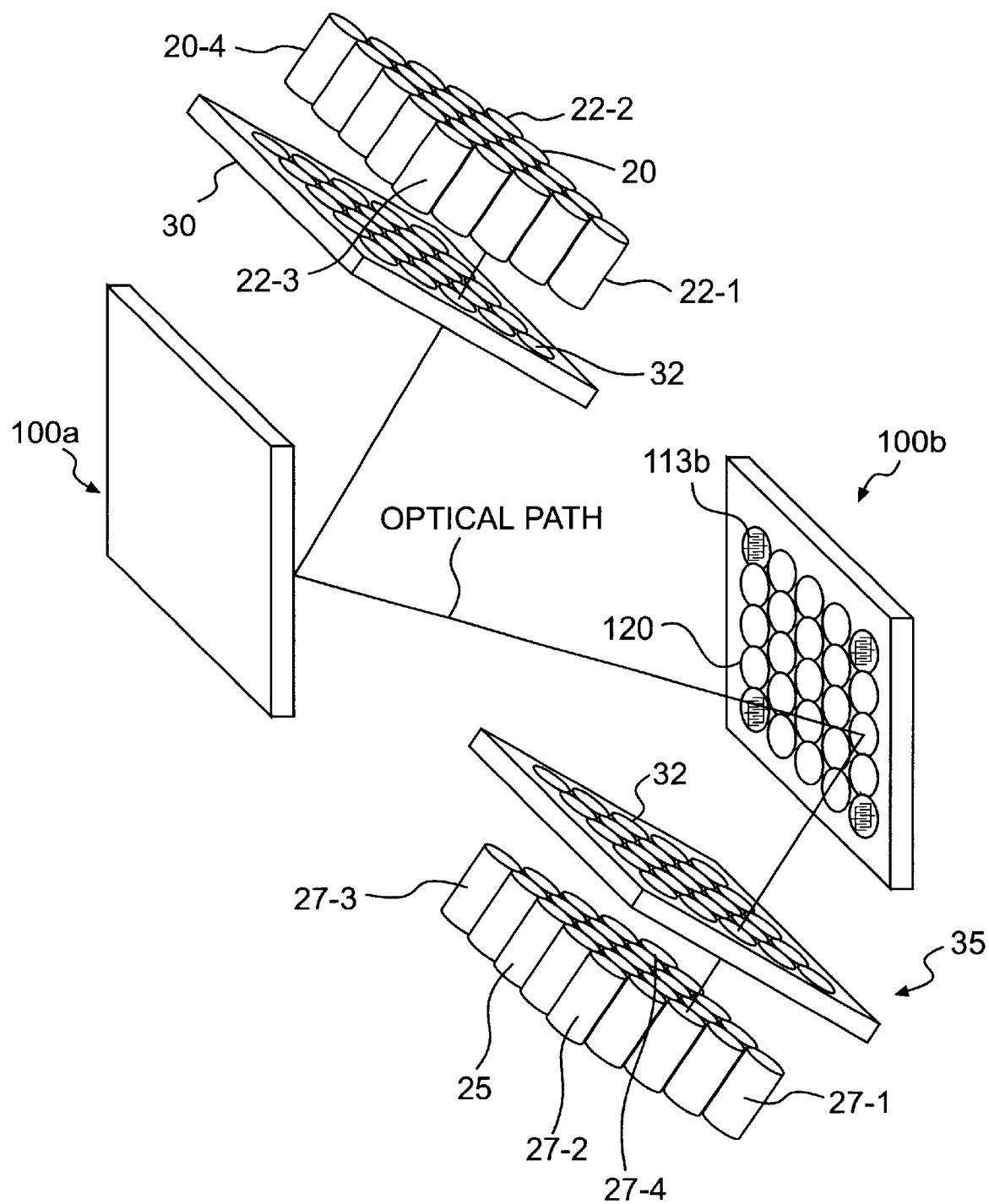
FIG. 13 illustrates an embodiment of an exemplary optical switch having micro-mirrors in accordance with the present invention.

FIG. 13 illustrates an exemplary embodiment of an optical switch in accordance with the schematic of FIG. 12. The embodiment of FIG. 13 has a similar arrangement to that shown in FIG. 3. In accordance with FIG. 13, switching substrate 100b includes an array of photodetectors 113b and switching elements 120 on a surface of the substrate 100b. In the embodiment of FIG. 13, photodetectors 113b are provided at the corners of a rectangular array. The rectangular array of photodetectors 113b and switching elements 120 correspond to the array of micro-lenses of lens array 35. Switching substrate 100a includes an array of photodetectors 113a and switching elements 120 arranged in a rectangular array similar to that provided on switching substrate 100b. The array of photodetectors 113a and switching elements 120 correspond to the array of micro-lenses of the lens array 30.

Fiber/lens array 30 and switching substrate 100a are aligned by coupling light from an optical signal source 34, such as an light emitting diode, a laser, or other signal source, to the ends of fibers 22. As noted above, a single optical signal source 34 may be used to generate light detectable by photodetectors 113 for each of fibers 22. The light is emitted from the ends of fibers 22 and collimated by micro-lenses 32. Lens array 30 and switching substrate 100a are moved relative to each other (e.g., by moving lens array 30, substrate 100a or both) until light is detected by each of the photodetectors 113. The lens array and switching substrate may then be finely adjusted in order to maximize the optical power detected by photodetectors 133 or until predetermine thresholds are achieved. Lens array 35 and switching substrate 100b may be aligned in a similar manner. Once properly aligned, the optical switch 10 may be used to selectively couple optical signals from input fibers 20 to selected output fibers 25, as described above in connection with FIG. 3.

Photodetectors 113a and 113b may be formed on the substrates 100a, 100b, respectively, using standard semiconductor processing techniques used in the semiconductor arts. Alternatively, photodetectors may be formed separately and applied to the substrates. Other electronic components, such as amplifiers, current detectors, and/or control equipment, may be formed with photodetectors on the switching substrate 100 or may be formed on a separate substrate.

Figure 14:
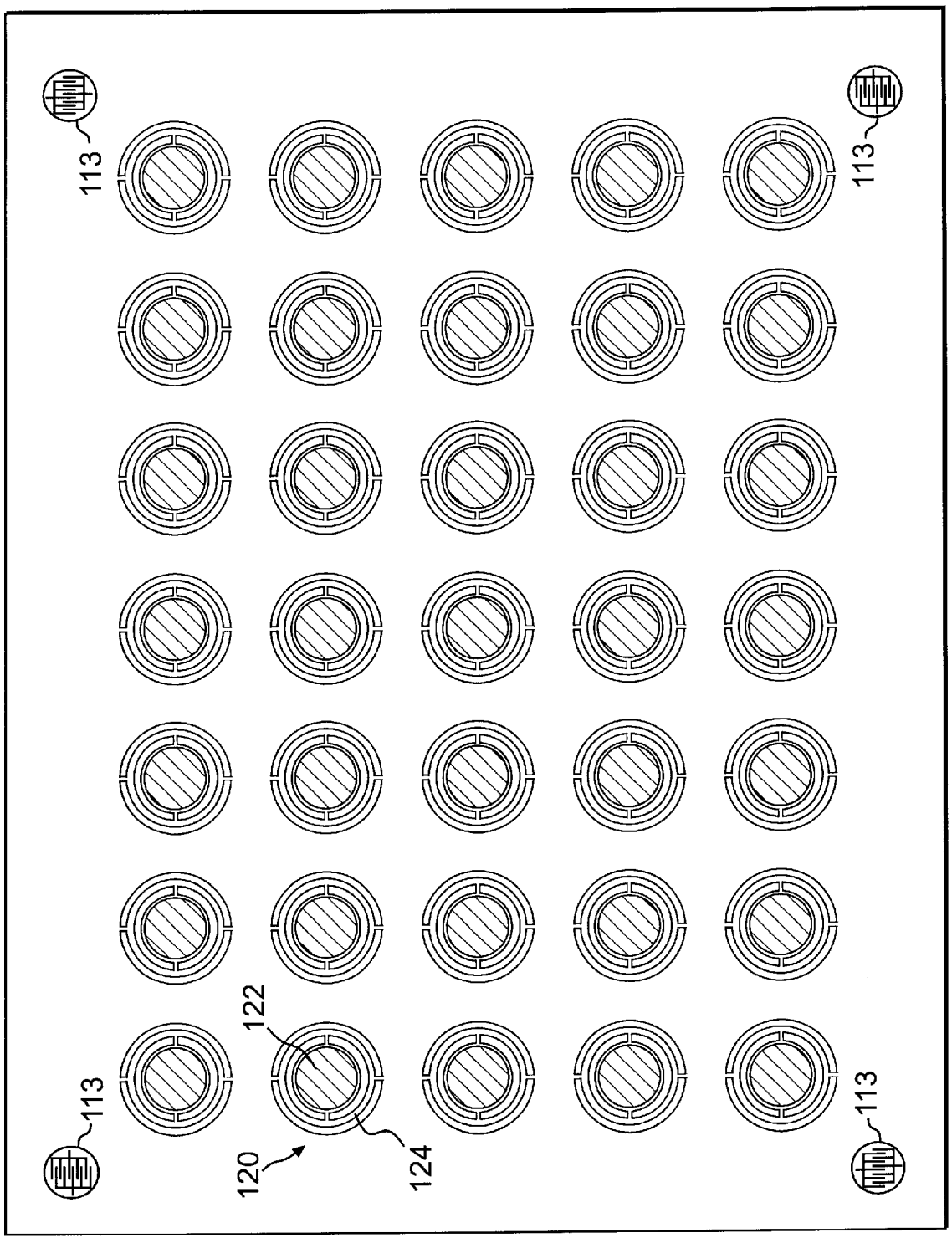
FIGS. 14–16 illustrate exemplary embodiments of a MEMS array substrate for an optical switch in accordance with the present invention.
Figure 15:
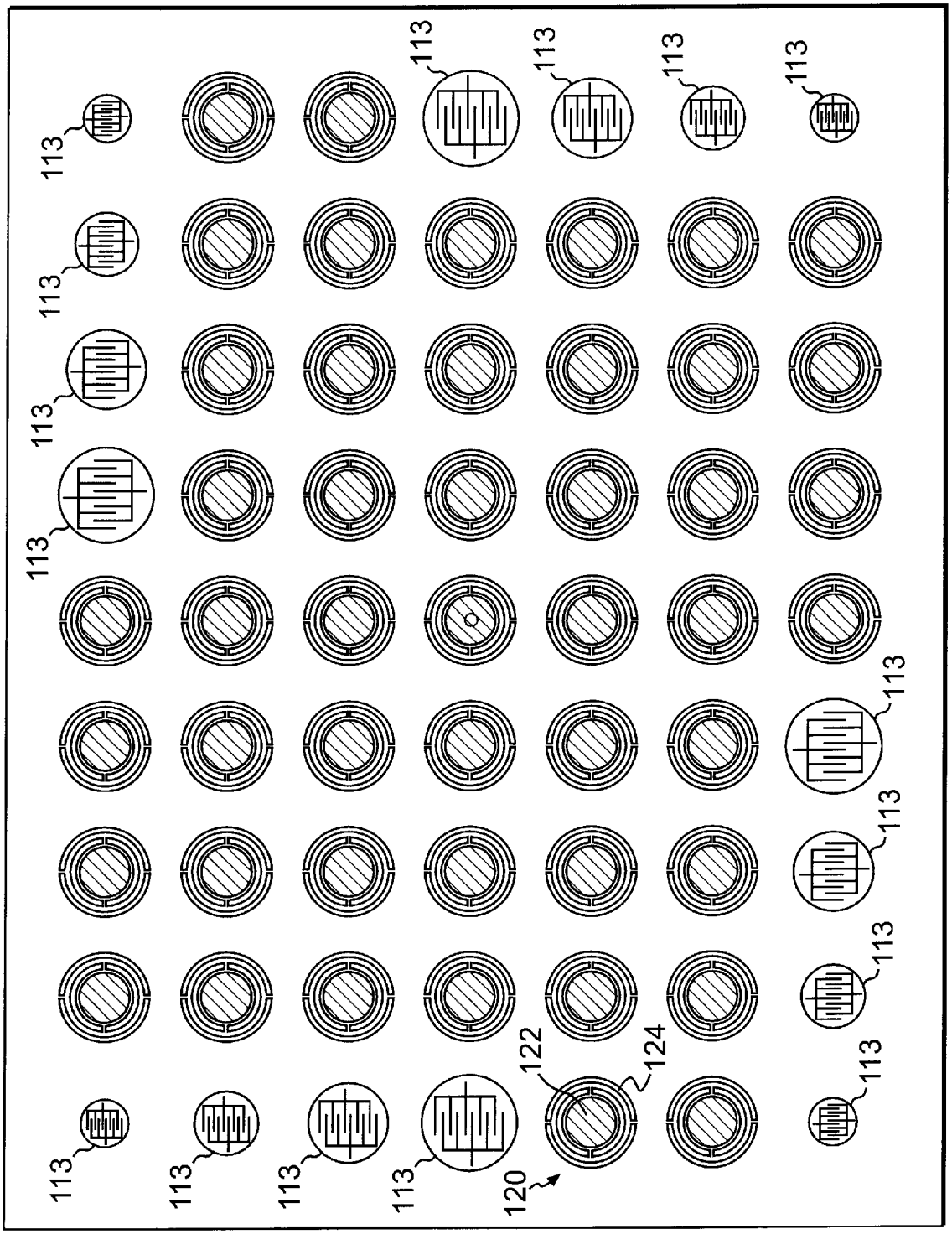

FIGS. 14 and 15 illustrate alternative arrangements of photodetectors 113 and switching elements 120 on the surface of switching substrate 100. As shown in FIG. 14, photodetectors 113 may be formed separately from an array of switching elements 120. FIG. 15 illustrates photodetectors 113 having different sizes and locations. The different sized photodetectors 113 are incorporated into the array of switching elements 120 on the surface of the switching substrate 100. The larger photodetectors 113 may be used for coarse position adjustments while the smaller photodetectors are used for fine adjustments. Some photodetectors 113 may have approximately the same active area as the spot area of the light from lens array or a smaller active area than the spot area. It should be clear that the switching substrate may be provided with a variety of sizes and shapes photodetectors provided in various arrangements.

Figure 16:
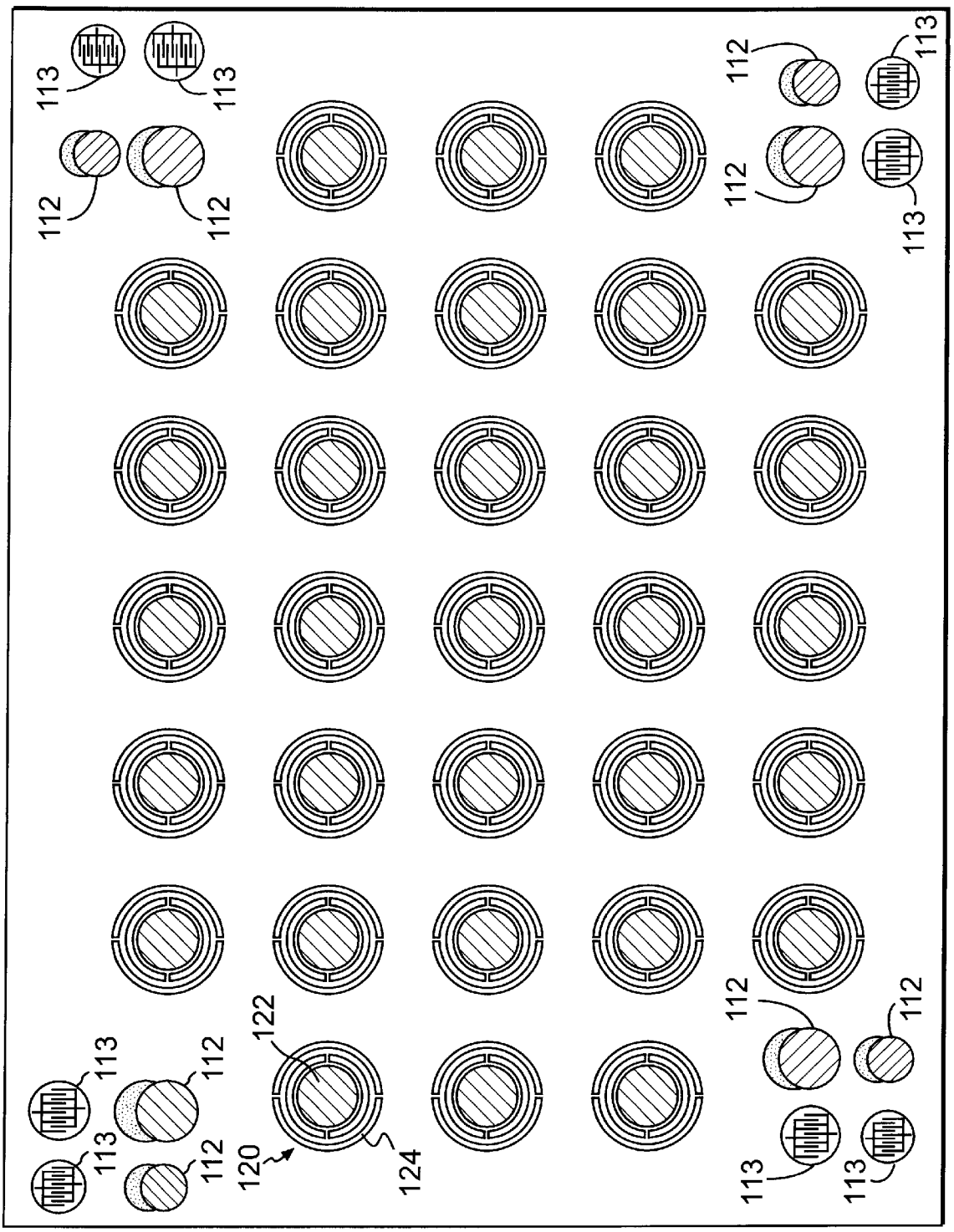

FIG. 16 illustrates an alternative arrangement that includes static mirrors 112, photodetectors 113, and switching elements 120 on the surface of the substrate 100. The static mirrors 112 and/or photodetectors 113 may be provided in variety of sizes, shapes, and locations on the substrate 100 as described above. The arrangement shown in FIG. 16 is merely an example. In accordance with FIG. 16, a variety of types of alignment devices may be used in connection with the present invention.

The alignment features of the present invention have been described primarily in connection with an optical switch having reflective switching elements. However, the alignment features and techniques described herein are applicable to the alignment of a fiber/lens array and other optical switching components, such as those used in liquid crystal optical switches and bubble-type optical switches, to name just a few. Moreover, while the present invention has been described in connection with optical switch components, it should be appreciated that the alignment mechanisms described herein may be used to align various types of equipment. The alignment mechanisms may be used together with other alignment mechanisms. For example, the alignment mechanisms described herein may be used for fine positional adjustments while other mechanisms may be used for coarse adjustment.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical switch comprising:
    an input optical array comprising input optical fibers and micro-lenses optically aligned with the input optical fibers;
    an output optical array comprising output optical fibers and micro-lenses optically aligned with the output optical fibers;
    an optical switching mechanism for selectively coupling input optical signals from the input optical fibers to selected output optical fibers, said optical switching mechanism including a first switching substrate having a plurality of movable micro-mirrors and at least one static alignment micro-mirror on a surface thereof facing the input optical array, said static alignment micro-mirror of the first substrate provided at an angle $\alpha 1$ relative to the surface of the first substrate so as to reflect the optical signal carried by an input optical fiber back into the input optical fiber, and a second switching substrate having a plurality of movable micro-mirrors and at least one static alignment micro-mirror on a surface thereof facing the output optical array, said static alignment micro-mirror of the second substrate provided at an angle $\alpha 2$ relative to the surface of the second substrate so as to reflect the optical signal carried by an output optical fiber back into the output optical fiber.

2. The optical switch according to claim 1, wherein each input optical fiber is integrated with a corresponding one of the micro-lenses.

3. An optical switch comprising:
    an input optical array comprising input optical fibers and micro-lenses optically aligned with the input optical fibers;
    an output optical array comprising output optical fibers and micro-lenses optically aligned with the output optical fibers;
    an optical switching mechanism for selectively coupling input optical signals from the input optical fibers to selected output optical fibers, said optical switching mechanism including a first switching substrate having a plurality of movable micro-mirrors and at least one static alignment micro-mirror on a surface thereof facing the input optical array, said static alignment micro-mirror of the first substrate provided at an angle $\alpha 1$ relative to the surface of the first substrate so as to reflect the optical signal carried by an input optical fiber back into the input optical fiber, and a second switching substrate having a plurality of movable micro-mirrors and at least one static alignment micro-mirror on a surface thereof facing the output optical array, said static alignment micro-mirror of the second substrate provided at an angle $\alpha 2$ relative to the surface of the second substrate so as to reflect the optical signal carried by an output optical fiber back into the output optical fiber; and
    a plurality of photodetectors coupled to a first group of the optical input fibers, said photodetectors for detecting the power of the optical signal back-reflected into the first group of optical input fibers by said static alignment micro-mirrors of the first switching substrate.

4. The optical switch according to claim 3, further comprising at least one light source coupled to the first group of the input optical fibers, said light source generating optical signals of a predetermined wavelength detectable by said photodetectors and propagating the optical signals of the predetermined wavelength.

5. The optical switch according to claim 4, wherein said predetermined wavelength differs from a wavelength of optical signals directed to the movable micro-mirrors by a second group of input optical fibers different from the first group.

6. An optical switch comprising:
    an input optical array comprising input optical fibers and micro-lenses optically aligned with the input optical fibers;
    an output optical array comprising output optical fibers and micro-lenses optically aligned with the output optical fibers;
    an optical switching mechanism for selectively coupling input optical signals from the input optical fibers to selected output optical fibers, said optical switching mechanism including a first switching substrate having a plurality of movable micro-mirrors and at least one static alignment micro-mirror on a surface thereof facing the input optical array, said static alignment micro-mirror of the first substrate provided at an angle α1 relative to the surface of the first substrate so as to reflect the optical signal carried by an input optical fiber back into the input optical fiber, and a second switching substrate having a plurality of movable micro-mirrors and at least one static alignment micro-mirror on a surface thereof facing the output optical array, said static alignment micro-mirror of the second substrate provided at an angle α2 relative to the surface of the second substrate so as to reflect the optical signal carried by an output optical fiber back into the output optical fiber; and a plurality of photodetectors coupled to a first group of the optical output fibers, said photodetectors for detecting the power of light back-reflected into the first group of optical output fibers by the static alignment micro-mirrors of the second switching substrate.

7. An optical switch comprising:

an input optical array comprising input optical fibers and micro-lenses optically aligned with the input optical fibers;

an output optical array comprising output optical fibers and micro-lenses optically aligned with the output optical fibers;

an optical switching mechanism for selectively coupling input optical signals from the input optical fibers to selected output optical fibers, said optical switching mechanism including a switching substrate having a plurality of movable micro-mirrors and at least one static alignment micro-mirror on a surface thereof facing the output optical array, said static alignment micro-mirror of the second substrate provided at an angle α relative to the surface of the second substrate so as to reflect the optical signal carried by an output optical fiber back into the output optical fiber.

8. The optical switch according to claim 7, wherein each output optical fiber is integrated with a corresponding one of the micro-lenses.

9. An optical switch comprising:

an input optical array comprising input optical fibers and micro-lenses optically aligned with the input optical fibers;

an output optical array comprising output optical fibers and micro-lenses optically aligned with the output optical fibers;

an optical switching mechanism for selectively coupling input optical signals from the input optical fibers to selected output optical fibers, said optical switching mechanism including a switching substrate having a plurality of movable micro-mirrors and at least one static alignment micro-mirror on a surface thereof facing the output optical array, said static alignment micro-mirror of the second substrate provided at an angle α relative to the surface of the second substrate so as to reflect the optical signal carried by an output optical fiber back into the output optical fiber; and a plurality of photodetectors coupled to a first group of the optical output fibers, said photodetectors for detecting the power of light back-reflected into the first group of optical output fibers by said static alignment micro-mirrors of the first switching substrate.

10. The optical switch according to claim 9, further comprising at least one light source, said light source generating optical signals of a predetermined wavelength detectable by said photodetectors.

11. The optical switch according to claim 10, wherein said predetermined wavelength differs from a wavelength of optical signals directed to the movable micro-mirrors.

12. A combination for an optical switch comprising:

an optical array comprising optical fibers and micro-lenses optically aligned with the optical fibers; and a switching substrate having a plurality of movable micro-mirrors and static alignment micro-mirrors on a surface thereof facing the optical array, wherein each of said static alignment micro-mirrors is provided at an angle α relative to the surface of the substrate so as to reflect an optical signal carried by an optical fiber back into the input optical fiber and each of said movable micro-mirrors for reflecting optical signals carried by the optical fibers at a selectable angle away from the optical array.

13. The combination according to claim 12, wherein the movable micro-mirrors and static alignment micro-mirrors are provided in an array on the surface of the switching substrate.

14. The combination according to claim 13, wherein the array is rectangular and the static alignment micro-mirrors are provided at least at the corners of the array.

15. The combination according to claim 12, wherein each optical fiber is integrated with a corresponding one of the micro-lenses.

16. The combination according to claim 12, wherein said predetermined wavelength differs from a wavelength of optical signals directed to the movable micro-mirrors by a second group of the optical fibers different from the first group.

17. The combination according to claim 12, wherein the switching substrate comprises a microelectromechanical system (MEMS) chip.

18. A combination for an optical switch comprising:

an optical array comprising optical fibers and micro-lenses optically aligned with the optical fibers; and a switching substrate having a plurality of movable micro-mirrors and static alignment micro-mirrors on a surface thereof facing the optical array, wherein each of said static alignment micro-mirrors is provided at an angle α relative to the surface of the substrate so as to reflect an optical signal carried by an optical fiber back into the input optical fiber and each of said movable micro-mirrors for reflecting optical signals carried by the optical fibers at a selectable angle away from the optical array; and a plurality of photodetectors coupled to a first group of the optical fibers, said photodetectors for detecting the power of light back-reflected into the first group of optical fibers by said static alignment micro-mirrors of the first switching substrate.

19. The combination according to claim 18, further comprising at least one light source coupled to the first group of optical fibers, said light source generating optical signals of a predetermined wavelength detectable by said photodetectors.

20. A method of aligning components of an optical switch comprising an optical array including optical fibers and micro-lenses optically aligned with the optical fibers and a switching substrate having a plurality of movable micro-mirrors and static alignment micro-mirrors on a surface thereof facing the optical array, each said static alignment micro-mirror provided at an angle α relative to the surface of the substrate, the method comprising:

detecting the power of back-reflected optical signals in the plurality of optical fibers; and moving at least one of the optical array and the switching substrate until the detected power in the plurality of optical fibers reaches a predetermined value.

21. An optical switch comprising:
an input optical array comprising input optical fibers and micro-lenses optically aligned with the input optical fibers;
an output optical array comprising output optical fibers and micro-lenses optically aligned with the output optical fibers;
an optical switching mechanism for selectively coupling optical signals from the input optical fibers to selected output optical fibers, said optical switching mechanism including a first switching substrate having a plurality of movable micro-mirrors and at least photodetector on a surface thereof facing the input optical array, wherein said photodetector is positioned to detect the optical signals carried by an input optical fiber, and a second switching substrate having a plurality of movable micro-mirrors and at least one photodetector on a surface thereof facing the output optical array, the photodetector positioned to detect the optical signals carried by an output optical fiber.

22. The optical switch according to claim 21, wherein each of the first and second switching substrates include multiple photodetectors, the photodetectors and movable micro-mirrors provided in an array.

23. The optical switch according to claim 22, wherein the arrays are rectangular and the photodetectors are provided at least at the corners of the arrays.

24. The optical switch according to claim 21, further comprising at least one light source, said light source generating optical signals of a predetermined wavelength detectable by said photodetectors.

25. The optical switch according to claim 21, wherein said predetermined wavelength differs from a wavelength of optical signals directed to the movable micro-mirrors.

26. The optical switch according to claim 21, wherein the first and second switching substrates comprise microelectromechanical system (MEMS) chips.

27. The combination according to claim 21, further comprising at least one static micro-mirrors provided on the surface of the switching substrate.

28. The combination according to claim 21, wherein the switching substrate comprises a microelectromechanical system (MEMS) chip.

29. A combination for an optical switch comprising:
an optical array comprising optical fibers and micro-lenses optically aligned with the optical fibers; and
a switching substrate having a plurality of movable micro-mirrors and a plurality of photodetectors on a surface thereof facing the optical array, the micro-mirrors and the photodetectors provided in an array so that each micro-mirror and photodetector corresponds to a micro-lens of the optical array.

30. The combination according to claim 29, further comprising at least one light source coupled to a first group of said optical fibers, said light source generating optical signals of a predetermined wavelength detectable by said photodetectors.

31. The combination according to claim 30, wherein said predetermined wavelength differs from a wavelength of optical signals directed to the movable micro-mirrors and carried by a second group of optical fibers different from the first group.

32. A method of aligning components of an optical switch comprising an optical array including optical fibers and micro-lenses optically aligned with the optical fibers and a switching substrate having a plurality of movable micro-mirrors and a plurality of photodetectors arranged in an array so that each micro-mirror and each photodetector corresponds to a micro-lens of the optical array, the method comprising:
transmitting light of a predetermined wavelength in the optical fibers optically aligned with the micro-lenses corresponding to the plurality of photodetectors;
detecting the power of optical signals detected by said photodetectors; and
moving at least one of the optical array and the switching substrate until the detected power reaches a predetermined value.

33. A method of aligning components of an optical switch comprising an optical array including optical fibers and micro-lenses optically aligned with the optical fibers and a switching substrate having a plurality of movable micro-mirrors and static alignment micro-mirrors on a surface thereof facing the optical array, each said static alignment micro-mirror provided at an angle α relative to the surface of the substrate, the method comprising:
positioning at least one optical detector at a desired position relative to one of the optical array and the switching substrate;
directing optical signals from the optical fibers to the static alignment micro-mirrors;
detecting optical signals reflected by the static alignment micro-mirrors using the detector; and
moving the other of the optical array and the switching substrate until the detected power reaches a predetermined value.

* * * * *